US010473515B2

(12) United States Patent
Imagawa

(10) Patent No.: US 10,473,515 B2
(45) Date of Patent: Nov. 12, 2019

(54) WEIGHT MEASURING DEVICE, WEIGHT MEASUREMENT METHOD, DISPLACEMENT COEFFICIENT CALCULATING DEVICE, AND DISPLACEMENT COEFFICIENT CALCULATION METHOD

(71) Applicant: Panasonic Intellectual Property Management Co., Ltd., Osaka (JP)

(72) Inventor: Taro Imagawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 166 days.

(21) Appl. No.: 15/649,624

(22) Filed: Jul. 13, 2017

(65) Prior Publication Data

US 2018/0045556 A1 Feb. 15, 2018

(30) Foreign Application Priority Data

Aug. 10, 2016 (JP) .................................. 2016-157653
Sep. 29, 2016 (JP) .................................. 2016-192361
Jun. 16, 2017 (JP) .................................. 2017-118302

(51) Int. Cl.
*G01G 19/02* (2006.01)
*G01B 11/14* (2006.01)
(Continued)

(52) U.S. Cl.
CPC ............. *G01G 19/02* (2013.01); *G01B 11/14* (2013.01); *G01G 19/022* (2013.01);
(Continued)

(58) Field of Classification Search
CPC ........ G01G 19/02; G01G 19/022; G06T 7/70; G06T 2207/30252; G01B 11/14; G06K 9/00798; G06K 9/00624; G06K 9/4642
See application file for complete search history.

(56) References Cited

U.S. PATENT DOCUMENTS 6,865,288 B1 * 3/2005 Shishido ................. G06T 7/001
382/141
7,668,692 B2 2/2010 Tatom et al.
(Continued)

FOREIGN PATENT DOCUMENTS

JP 2010-197249 9/2010
JP 5424787 B 2/2014
(Continued)

*Primary Examiner* — Bryan Bui
(74) *Attorney, Agent, or Firm* — Wenderoth, Lind & Ponack, L.L.P.

(57) ABSTRACT

A weight measuring device includes a displacement amount detector, a storage unit, and a weight calculator. The displacement amount detector detects, by using a captured image obtained by capturing a road and a vehicle present on the road, a displacement amount, in the captured image, corresponding to displacement caused on the road by application of a weight of the vehicle. The storage unit stores first information indicating a relation between the weight and the displacement amount. The weight calculator calculates the weight based on the displacement amount and the first information.

19 Claims, 18 Drawing Sheets

(51) Int. Cl.
*G06K 9/00* (2006.01)
*G06T 7/70* (2017.01)
*G06K 9/46* (2006.01)

(52) U.S. Cl.
CPC ..... *G06K 9/00624* (2013.01); *G06K 9/00798* (2013.01); *G06K 9/4642* (2013.01); *G06T 7/70* (2017.01); *G06K 2209/23* (2013.01); *G06T 2207/30236* (2013.01); *G06T 2207/30252* (2013.01)

(56) References Cited

U.S. PATENT DOCUMENTS

| | | |
|---|---|---|
| 8,736,458 B2 | 5/2014 | Reynolds et al. |
| 2011/0015850 A1* | 1/2011 | Tange .................. B60W 30/12 |
| | | 701/116 |
| 2015/0215584 A1 | 7/2015 | Tapia et al. |
| 2017/0307360 A1* | 10/2017 | Imai ....................... G01B 11/16 |

FOREIGN PATENT DOCUMENTS

| | | |
|---|---|---|
| JP | 2014-228480 | 12/2014 |
| JP | 2015-197344 | 11/2015 |

* cited by examiner

FIG. 3

| X<br>Y | Range 1<br>(1~10 pixels) | Range 2<br>(11~20 pixels) | Range 3<br>(21~30 pixels) | ... |
|---|---|---|---|---|
| Range 1<br>(1~10 pixels) | 5 | 4.5 | 5 | ... |
| Range 2<br>(11~20 pixels) | 6 | 5 | 5 | ... |
| Range 3<br>(21~30 pixels) | 4 | 4 | 4 | ... |
| ⋮ | ⋮ | ⋮ | ⋮ | ⋮ |

WEIGHT MEASURING DEVICE, WEIGHT MEASUREMENT METHOD, DISPLACEMENT COEFFICIENT CALCULATING DEVICE, AND DISPLACEMENT COEFFICIENT CALCULATION METHOD

BACKGROUND

1. Technical Field

The present disclosure relates to a weight measuring device and a weight measurement method for measuring a vehicle weight. The present disclosure also relates to a displacement coefficient calculating device and a displacement coefficient calculation method for calculating a displacement coefficient for specifying a relation between a vehicle weight and a displacement amount caused on a road due to the weight.

2. Description of the Related Art

Conventionally, a weight measuring device that measures a weight of a vehicle or the like has been known. For example, Japanese patent No. 5424787 discloses a weight measuring device for measuring a weight of a vehicle running on a road. This weight measuring device measures the weight of the vehicle using a weight sensor embedded in the road.

SUMMARY

The conventional weight measuring device described above needs to embed the weight sensor for measuring the weight in the road. Therefore, installment or removal of the conventional weight measuring device needs a certain amount of cost and labor.

In view of this, the present disclosure provides a weight measuring device that can keep labor and cost for installment or removal lower than conventionally.

A weight measuring device according to one aspect of the present disclosure includes a displacement amount detector, a storage unit, and a weight calculator. The displacement amount detector detects, by using a captured image obtained by capturing a road and a vehicle present on the road, a displacement amount, in the captured image, corresponding to displacement caused on the road by application of a weight of the vehicle. The storage unit stores first information indicating a relation between the weight and the displacement amount. The weight calculator calculates the weight based on the displacement amount and the first information.

The weight measuring device according to the present disclosure can keep labor and cost for installment or removal lower than conventionally.

BRIEF DESCRIPTION OF THE DRAWINGS

FIG. 3 is a configuration diagram of displacement coefficient data;

DETAILED DESCRIPTION

Figure 1:
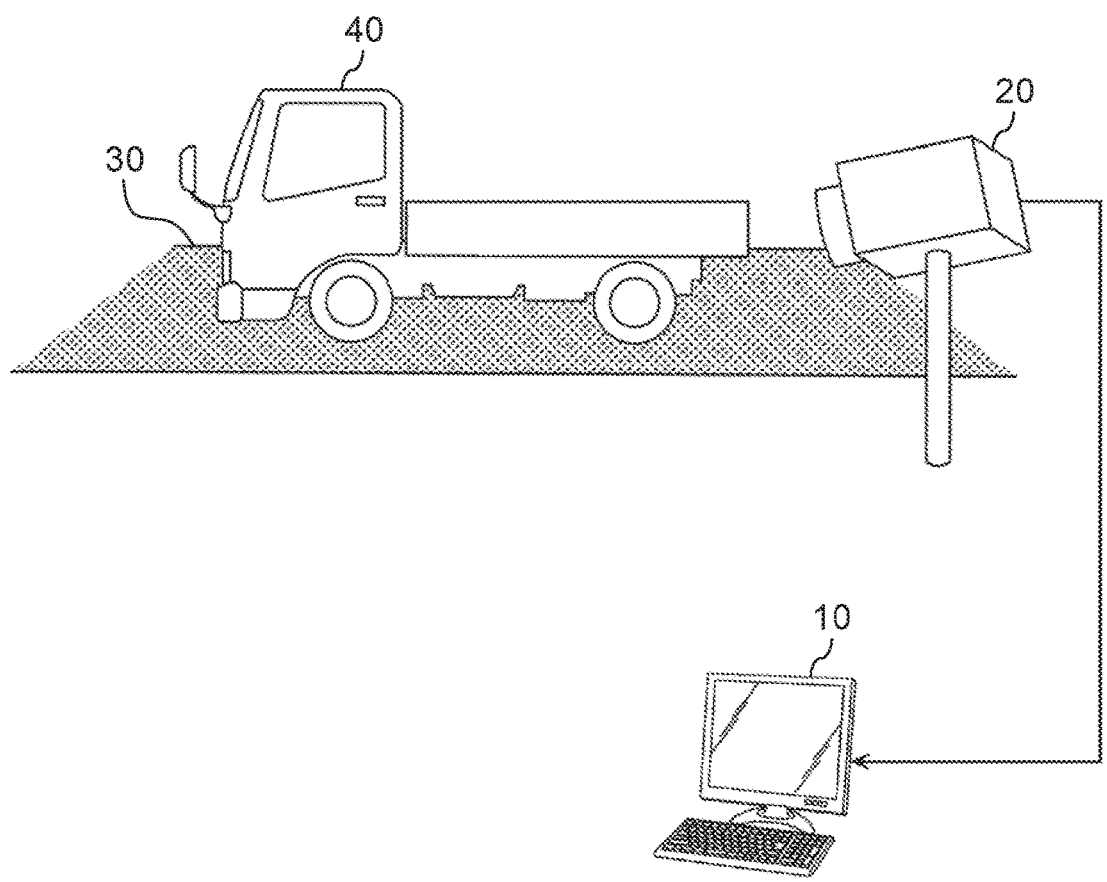
FIG. 1 is an external appearance view schematically illustrating one example of a state of measuring a weight.

A weight measuring device according to one aspect of an exemplary embodiment includes a displacement amount detector, a storage unit, and a weight calculator. The displacement amount detector detects, by using a captured image obtained by capturing a road and a vehicle present on the road, a displacement amount, in the captured image, corresponding to displacement caused on the road by application of a weight of the vehicle. The storage unit stores first information indicating a relation between the weight and the displacement amount. The weight calculator calculates the weight based on the displacement amount and the first information stored in the storage unit.

According to this configuration, the weight measuring device can measure the weight of the vehicle in a non-contact manner. Therefore, when the weight measuring device is installed, it is unnecessary to embed sensors, required for measuring the weight, in the road. Accordingly, with the weight measuring device, labor and cost for installing or removing the weight measuring device can be kept lower than conventionally.

For example, the weight measuring device may also include a weight storage unit and a calculator. The weight storage unit may store second information pertaining to the weight, and the calculator may calculate, as the first information, a displacement coefficient for specifying a relation between the weight and the displacement amount based on the displacement amount detected by the displacement amount detector and the second information stored in the weight storage unit.

According to this configuration, the weight measuring device can calculate the displacement coefficient used for weight calculation. Therefore, the weight measuring device can measure the weight, even if the displacement coefficient has not been known.

For example, the weight measuring device may further include an aggregation unit. The aggregation unit may aggregate a plurality of the displacement amounts detected by the displacement amount detector using a plurality of the captured images, and the calculator may calculate the displacement coefficient based on an aggregation result obtained by the aggregation unit.

According to this configuration, the displacement coefficient can be calculated by using a displacement amount detected in the past.

For example, the calculator may calculate the displacement coefficient by using, as the aggregation result, a characteristic of a displacement amount distribution corresponding to a plurality of the displacement amounts aggregated by the aggregation unit.

According to this configuration, the displacement coefficient can be calculated with a certain level of precision.

For example, the characteristic of the displacement amount distribution may be a mode of the displacement amount distribution, and the second information may be information indicating a weight of a vehicle model (vehicle type) whose amount of traffic is the highest on the road.

According to this configuration, the displacement coefficient can be calculated with relatively less amount of computation.

For example, the weight measuring device may further include a recognizer. The recognizer may recognize a specific vehicle using the captured image, the second information may be information indicating a weight of the specific vehicle, and the calculator may be configured to, when a displacement amount corresponding to displacement caused on the road by application of the weight of the specific vehicle is detected by the displacement amount detector, calculate the displacement coefficient based on the displacement amount and the second information.

According to this configuration, the displacement coefficient can be calculated by using the specific vehicle whose weight has been known.

For example, the weight measuring device may further include a weight position specifier. The weight position specifier may specify a weight position of the vehicle in the captured image, and the displacement amount detector may be configured to, when the weight position is specified by the weight position specifier, detect a displacement amount, in the captured image, corresponding to displacement on the specified weight position.

According to this configuration, the displacement amount on the actual weight position can be detected. Thus, more precise weight measurement is enabled.

For example, the displacement coefficient stored in the storage unit may have, for each of a plurality of positions which may be specified as a weight position by the weight position specifier, a numerical value, and the weight calculator may be configured to, when the weight position of the vehicle is specified by the weight position specifier, calculate the weight based on the numerical value associated with the specified weight position.

According to this configuration, the weight can be measured by using the numerical value of the displacement coefficient associated with the actual weight position. Thus, more precise weight measurement is enabled.

For example, the displacement amount detector may be configured to, when a weight position of the vehicle is specified by the weight position specifier, detect a displacement amount, in the captured image, corresponding to displacement on a non-weight position other than the specified weight position, and the weight calculator may calculate the weight using the displacement amount which corresponds to the non-weight position and is detected by the displacement amount detector.

According to this configuration, the weight can be measured by correcting an effect of shake of a camera used for capturing an image. Thus, more precise weight measurement is enabled.

For example, the weight measuring device may further include a track recognizer. The track recognizer may recognize a vehicle captured as a second captured image at a time different from a time at which the vehicle is captured as a first captured image, and the weight calculator may be configured to, when the vehicle is recognized in the second captured image by the track recognizer, calculate the weight based on a first displacement amount, in the first captured image, corresponding to displacement caused on the road by application of the weight of the vehicle and a second displacement amount, in the second captured image, corresponding to displacement caused on the road by application of the weight of the vehicle.

According to this configuration, the weight of a single vehicle can be measured by using two displacement amounts for the vehicle. Thus, more precise weight measurement is enabled.

For example, the weight measuring device may further include an output unit. The output unit may be configured to, when a weight deviating from a predetermined range is calculated by the weight calculator, perform an output indicating that the weight deviating from the predetermined range is calculated.

According to this configuration, a user using the weight measuring device can be notified that the vehicle is highly likely to be overloaded.

For example, the weight measuring device may also include an image generator and a display. The image generator may generate an image based on the displacement coefficient calculated by the calculator, and the display may display the image generated by the image generator as being superimposed on the captured image.

According to this configuration, the user using the weight measuring device can visually recognize a relation between the road and the displacement coefficient.

A weight measurement method according to one aspect of the exemplary embodiment includes: a displacement amount detection step for detecting, by using a captured image obtained by capturing a road and a vehicle present on the road, a displacement amount, in a captured image, corresponding to displacement caused on the road by application of a weight of the vehicle; and a weight calculation step for calculating the weight based on the displacement amount detected in the displacement amount detection step and information which is stored in a storage unit and indicates a relation between the weight and the displacement amount.

According to this configuration, a weight measuring device using this weight measurement method can measure the weight of the vehicle in a non-contact manner. Therefore, when the weight measuring device using this weight measurement method is installed, it is unnecessary to embed sensors, required for measuring the weight, in the road. Accordingly, with the weight measurement method, labor and cost for installing or removing the weight measuring device can be kept lower than conventionally.

A weight measurement program according to one aspect of the exemplary embodiment is a weight measurement program for causing a computer to execute a weight measurement process. The weight measurement process includes: a displacement amount detection step for detecting, by using a captured image obtained by capturing a road and a vehicle present on the road, a displacement amount, in the captured image, corresponding to displacement caused on the road by application of a weight of the vehicle; and a weight calculation step for calculating the weight based on the displacement amount detected in the displacement amount detection step and information which is stored in a storage unit and indicates a relation between the weight and the displacement amount.

According to this configuration, a weight measuring device using this weight measurement program can measure the weight of the vehicle in a non-contact manner. Therefore, when the weight measuring device using this weight measurement program is installed, it is unnecessary to embed sensors, required for measuring the weight, in the road. Accordingly, with the weight measurement program, labor and cost for installing or removing the weight measuring device can be kept lower than conventionally.

A displacement coefficient calculating device according to one aspect of the exemplary embodiment includes a displacement amount detector, an aggregation unit, a weight storage unit, and a calculator. The displacement amount detector detects, by using a captured image obtained by capturing a road and a vehicle present on the road, a displacement amount in the captured image corresponding to displacement caused on the road by application of a weight of the vehicle. The aggregation unit aggregates a plurality of the displacement amounts detected by the displacement amount detector by using a plurality of the captured images. The weight storage unit stores information pertaining to the weight. The calculator calculates a displacement coefficient for specifying a relation between the weight and the displacement amount based on an aggregation result obtained by the aggregation unit and the information stored in the weight storage unit.

According to this configuration, the displacement coefficient calculating device can calculate the displacement coefficient in a non-contact manner. Therefore, when the displacement coefficient calculating device is installed, it is unnecessary to embed sensors, required for calculating the displacement coefficient, in the road. Accordingly, with the displacement coefficient calculating device, labor and cost for installing or removing the displacement coefficient calculating device can be kept lower than conventionally.

For example, the calculator may calculate the displacement coefficient by using, as the aggregation result, a characteristic of a displacement amount distribution corresponding to a plurality of the displacement amounts aggregated by the aggregation unit.

According to this configuration, the displacement coefficient can be calculated with a certain level of precision.

For example, the characteristic of the displacement amount distribution may be a mode of the displacement amount distribution, and the information stored in the weight storage unit may be information indicating a weight of a vehicle model whose amount of traffic is the highest on the road.

According to this configuration, the displacement coefficient can be calculated with relatively less amount of computation.

For example, the displacement coefficient calculated by the calculator may have, for each of a plurality of regions which is different from one another in the captured image, a numerical value.

According to this configuration, the displacement coefficient on which the characteristic on each of different positions is reflected can be calculated.

For example, the displacement coefficient calculating device may further include an output unit. The output unit may be configured to, when a displacement coefficient deviating from a reference range is calculated by the calculator, perform an output indicating that the displacement coefficient deviating from the reference range is calculated.

According to this configuration, a user using the displacement coefficient calculating device can be notified of a possibility of a road surface being in an abnormal state.

For example, the displacement coefficient calculating device may also include an image generator and a display. The image generator may generate an image based on the displacement coefficient calculated by the calculator, and the display may display the image generated by the image generator as being superimposed on the captured image.

According to this configuration, the user using the displacement coefficient calculating device can visually recognize the relation between the road and the displacement coefficient.

A displacement coefficient calculation method according to one aspect of the exemplary embodiment includes: a displacement amount detection step for detecting, by using a captured image obtained by capturing a road and a vehicle present on the road, a displacement amount, in the captured image, corresponding to displacement caused on the road by application of a weight of the vehicle; an aggregation step for aggregating a plurality of the displacement amounts detected in the displacement amount detection step by using a plurality of the captured images; and a calculation step for calculating a displacement coefficient for specifying a relation between the weight and the displacement amount based on an aggregation result obtained in the aggregation step and information pertaining to the weight stored in the weight storage unit.

According to this configuration, a displacement coefficient calculating device using this displacement coefficient calculation method can calculate the displacement coefficient in a non-contact manner. Therefore, when the displacement coefficient calculating device using this displacement coefficient calculation method is installed, it is unnecessary to embed sensors, required for calculating the displacement coefficient, in the road. Accordingly, with the displacement coefficient calculation method, labor and cost for installing or removing the displacement coefficient calculating device can be kept lower than conventionally.

It is to be noted that these generic or specific aspects may be implemented using a system, a method, an integrated circuit, a computer program, or a computer-readable recording medium such as a compact disc read only memory (CD-ROM), and may also be implemented by any combination of the system, the method, the integrated circuit, the computer program, and the recording medium.

Hereinafter, specific examples of a weight measuring device and a displacement coefficient calculating device according to one aspect of the present disclosure will be described. It should be noted that each of the exemplary embodiments described hereafter illustrates a preferred example of the present disclosure. The numerical values, shapes, materials, components, the arrangement and connection of the components, steps, the processing order of the steps, etc. shown in the following exemplary embodiments are mere examples, and are not intended to limit the present disclosure. The present disclosure is limited only by the scope of the claims. Accordingly, among the components in the following exemplary embodiments, components not recited in any of independent claims indicating the most generic concept of the present disclosure are not essential for achieving the object of the present disclosure but are described as preferable components.

First Exemplary Embodiment

Herein, a weight measuring device for measuring a weight of a vehicle present on a road will be described as one aspect of the present disclosure.

This weight measuring device receives, from an external imaging device, a plurality of captured images each of which captures an image of a specific road. The weight measuring device then detects a displacement amount corresponding to displacement caused on the road from the captured images, and calculates a weight of the vehicle which causes the displacement amount based on the detected displacement amount.

Thus, the weight measuring device can measure the weight of the vehicle without being in contact with the road and the vehicle.

Hereinafter, the detail of the weight measuring device will be described with reference to the drawings.

[1-1. Configuration]

FIG. 1 is an external appearance view schematically illustrating one example of a state in which a weight of vehicle 40 is measured by using weight measuring device 10 according to a first exemplary embodiment. Herein, for example, weight measuring device 10 is connected to imaging device 20 that captures an image of road 30 such as an asphaltic road and on which vehicle 40 such as a truck travels. A plurality of captured images captured by imaging device 20 is input to weight measuring device 10.

Figure 2:
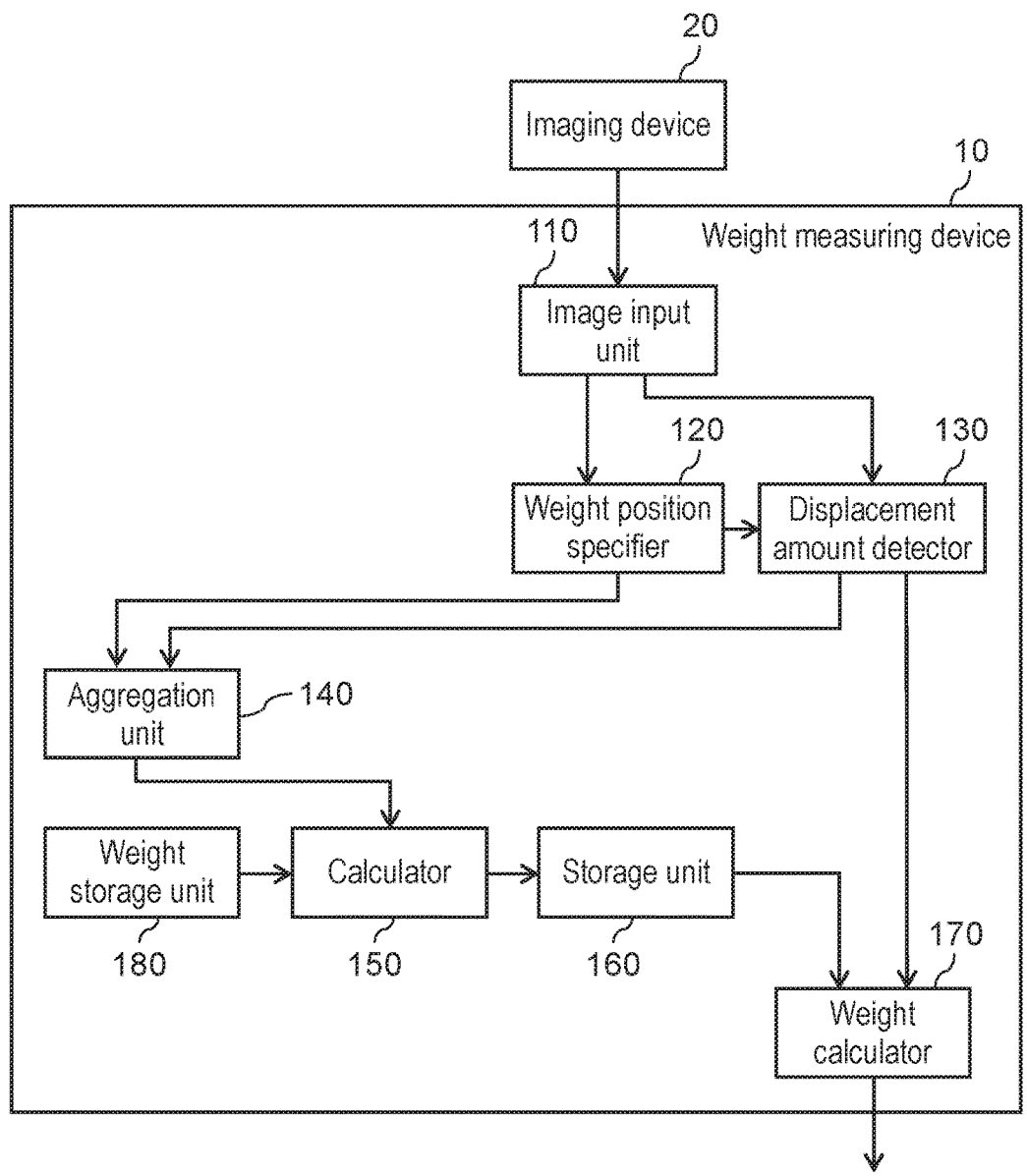
FIG. 2 is a block diagram illustrating a configuration of a weight measuring device.

FIG. 2 is a block diagram illustrating a configuration of weight measuring device 10. As illustrated in FIG. 2, weight measuring device 10 includes image input unit 110, weight position specifier 120, displacement amount detector 130, aggregation unit 140, calculator 150, storage unit 160, weight calculator 170, and weight storage unit 180.

Weight measuring device 10 is implemented in such a way that a microprocessor (not illustrated) in a computer (not illustrated) provided with the microprocessor and a memory (not illustrated) executes a program stored in the memory.

Image input unit 110 receives an input of the plurality of captured images captured by imaging device 20. Image input unit 110 receives an input of a digital image with 4096×2160 pixels, for example. The captured images are input through wireless or wired communication or through a recording medium.

When the captured image received by image input unit 110 includes a vehicle, weight position specifier 120 specifies a weight position of the vehicle in the captured image. More specifically, weight position specifier 120 performs an image recognition process on the captured image to determine whether or not the captured image includes the vehicle. When determining that the captured image includes the vehicle, weight position specifier 120 performs an additional image recognition process, thereby recognizing a tire of the vehicle and specifying a region on the road corresponding to the lowermost point of the tire as the weight position.

Displacement amount detector 130 detects, by using the captured image obtained by capturing the road and the vehicle present on the road, a displacement amount, in the captured image, corresponding to displacement caused on the road by application of the weight of the vehicle. Particularly, when the weight position is specified by weight position specifier 120, displacement amount detector 130 detects a displacement amount, in the captured image, corresponding to displacement on the specified weight position. Specifically, displacement amount detector 130 detects the displacement amount corresponding to the displacement by comparing a captured image in which displacement does not occur on the road and a captured image in which displacement occurs on the road, from among the plurality of captured images received by image input unit 110.

The detection of the displacement amount corresponding to the displacement by comparison among the plurality of captured images can be implemented by block matching, a correlation method, or an optical flow. For example, this displacement amount is calculated as a number of pixels indicating a difference in pixel positions corresponding to the same point on the road in the captured images which are to be compared. The captured image in which displacement does not occur may be a captured image which is captured in advance without the presence of an object which may be a weight, a captured image in which an amount of change therein is lower than or equal to a certain level among a plurality of captured images captured continuously in terms of time, or a captured image determined not to include an object which may be a weight as a result of an image recognition process.

Aggregation unit 140 aggregates a plurality of displacement amounts detected by displacement amount detector 130 for the plurality of captured images. Particularly, when the weight position is specified by weight position specifier 120, aggregation unit 140 aggregates in such a way that the specified weight position and the displacement amount are associated with each other.

Storage unit 160 stores first information indicating a relation between the weight and the displacement amount. More specifically, storage unit 160 stores, as the first information, a relational expression indicating, when displacement is caused on the road by application of weight on the road, a relation between the weight and the displacement amount corresponding to the displacement, and a displacement coefficient which is a coefficient used for this relational expression.

In general, weight w (kg) is represented by an expression of w=f(d) as function f of displacement amount d (number of pixels). Herein, function f is handled after being approximated by a primary expression. Therefore, storage unit 160 stores primary expression (w=ad) as the relational expression where d represents a variable and a represents a coefficient, and stores coefficient α as the displacement coefficient.

Displacement coefficient α has, for each of a plurality of positions which can be specified as a weight position by weight position specifier 120, a displacement coefficient value associated with the position. Therefore, a displacement coefficient value being different for each region on the road can be reflected on weight calculation. The displacement coefficient value being different for each region on the road is based on that the distances from a capturing position to the respective regions are different, the composition of asphalt or the like of the road is different for each region, the road surface temperature is different for each region, and the deterioration state of the road surface is different for each region, for example. Herein, displacement coefficient α has, for each of regions (hereinafter referred to as "local regions") of 10 pixels in width (x direction) and 10 pixels in height (y direction), for example, in the captured image, a displacement coefficient value corresponding to the local region.

FIG. 3 illustrates one example of displacement coefficient α stored in storage unit 160. Storage unit 160 stores a predetermined relational expression and a predetermined displacement coefficient in an initial state. When a displacement coefficient is newly calculated by calculator 150, the stored displacement coefficient is updated by the newly calculated displacement coefficient.

Weight calculator 170 calculates the weight of the vehicle on the road based on the displacement amount detected by displacement amount detector 130 and the first information stored in storage unit 160. Particularly, when the weight position is specified by weight position specifier 120, weight calculator 170 calculates the weight based on the displacement amount corresponding to the displacement on the specified weight position. More specifically, weight calculator 170 calculates weight w by multiplying displacement amount d detected by displacement amount detector 130 by the displacement coefficient value corresponding to the region including the weight position specified by weight position specifier 120.

Weight storage unit 180 stores second information pertaining to the weight. More specifically, weight storage unit 180 stores, as the second information, a weight of a vehicle model whose amount of traffic is the highest on road 30. Weight storage unit 180 may be implemented by a memory (not illustrated) constituting weight measuring device 10 or a database of an external device which can perform communication.

Calculator 150 calculates, as the first information, a displacement coefficient for specifying a relation between the weight and the displacement amount based on the displacement amount detected by displacement amount detector 130 and the second information stored in weight storage unit 180. Then, calculator 150 overwrites the displacement coefficient stored in storage unit 160 by using the calculated displacement coefficient. The detail of the method for calculating the displacement coefficient will be described later in the description of a first displacement coefficient updating process.

The operation of weight measuring device 10 having the above-mentioned configuration will be described with reference to the drawings hereafter.

[1-2. Operation]

Weight measuring device 10 performs, as its characteristic operation, a first measurement process and a first displacement coefficient updating process.

[1-2-1. First Measurement Process]

The first measurement process is, when a captured image including a vehicle is input to weight measuring device 10, to calculate the weight of the vehicle.

Figure 4:
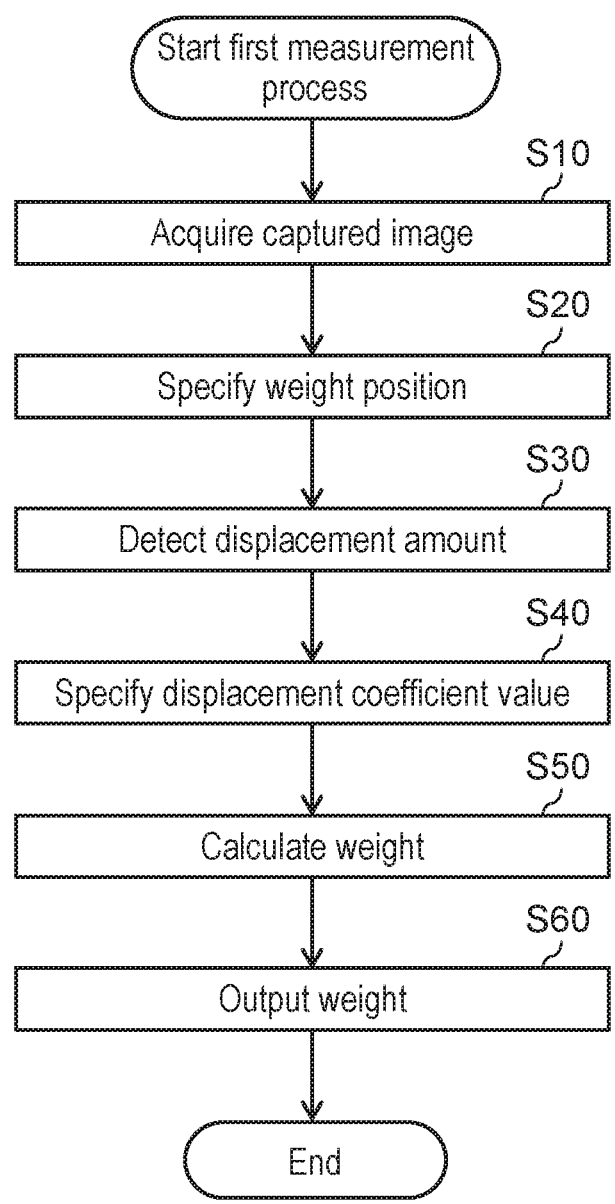
FIG. 4 is a flowchart of a first measurement process.

FIG. 4 is a flowchart of the first measurement process. This first measurement process is started when image input unit 110 acquires a captured image including a vehicle (this captured image is hereinafter referred to as "captured image A").

When the first measurement process is started, image input unit 110 acquires captured image A input from imaging device 20 (step S10).

Figure 5:
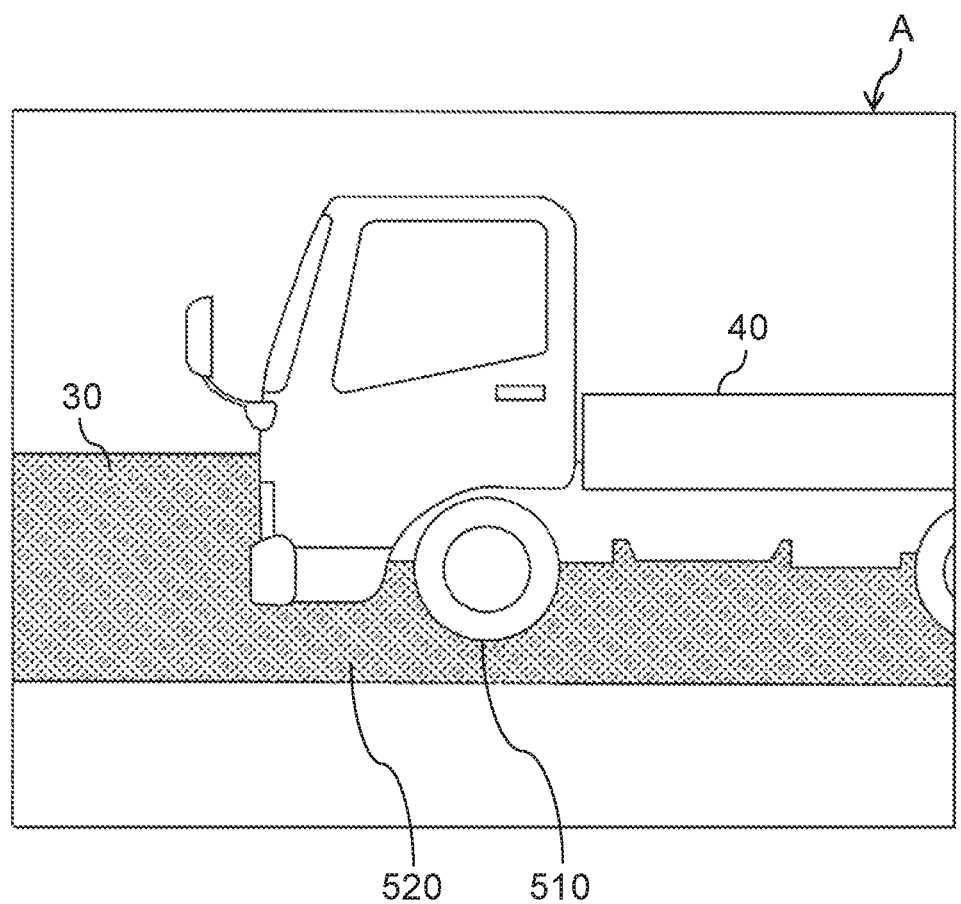
FIG. 5 is a view illustrating one example of captured image A.

FIG. 5 is a view illustrating one example of captured image A acquired. Captured image A includes vehicle 40 traveling on road 30. Vehicle 40 is in contact with road 30 on lowermost point 510 of the tire thereof. Region 520 corresponds to region 620 (see FIG. 6) in later-described captured image B.

When captured image A is acquired in the process in step S10, weight position specifier 120 performs an image recognition process to specify lowermost point 510 of the tire of vehicle 40, and specifies a region corresponding to specified lowermost point 510 on road 30 as a weight position (step S20).

The weight position specified here is not necessarily one point (one pixel), but may be specified as a local image region including a plurality of adjacent pixels. Note that a weight detection range from which a weight is to be detected may be limited to the region of road 30 or may be limited to a portion of road 30 as in region 630 in FIG. 6. The weight detection range may be designated by a user, or by both the user and image recognition for the color or texture of the road in cooperation with each other. Limiting the weight detection range provides an effect of reducing an image processing amount. Therefore, a processing amount for detecting the weight position can be reduced. It is to be noted that, when a plurality of tires are in contact with road 30 in the captured image, weight position specifier 120 detects the respective weight positions corresponding to the contact positions.

When the weight position is specified, displacement amount detector 130 detects a displacement amount corresponding to displacement caused on the specified weight position on the road (step S30). The detection of the displacement amount uses captured image A and a captured image in which displacement does not occur (this captured image is referred to as "captured image B") from among the captured images acquired by image input unit 110. If captured image B is not acquired by image input unit 110 before the weight position is specified, displacement amount detector 130 waits until captured image B is acquired by image input unit 110, and then, detects the displacement amount.

Figure 6:
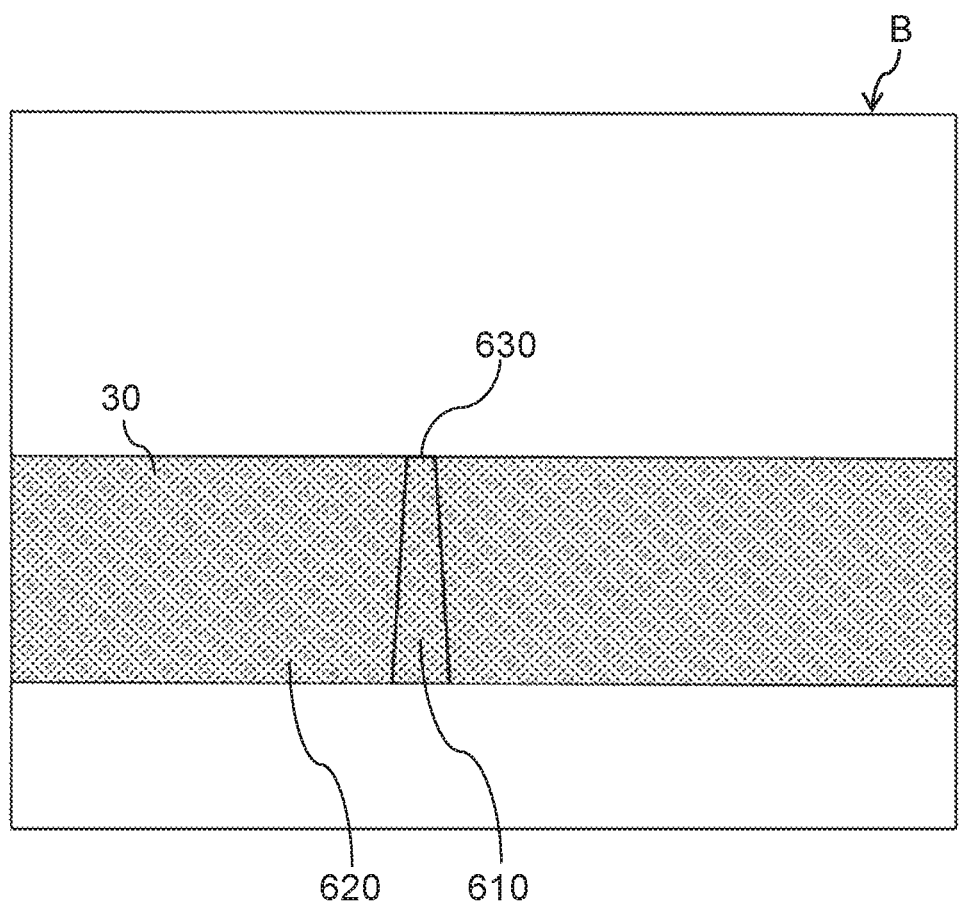
FIG. 6 is a view illustrating one example of captured image B.

FIG. 6 is a view illustrating one example of captured image B acquired. Captured image B is an image obtained by capturing the location same as the location in captured image A (see FIG. 5) from the same viewpoint. Region 610 on road 30 in captured image B is the same as the region corresponding to lowermost point 510 of the tire on road 30 in captured image A. In addition, region 620 on road 30 in captured image B is the same as region 520 on road 30 in captured image A.

Displacement amount detector 130 detects a displacement amount caused between the region corresponding to lowermost point 510 on road 30 in captured image A and region 610 in captured image B. Because a displacement amount on the road caused by a weight of a typical vehicle is very small, it is desirable to suppress an effect of shake of imaging device 20 due to vibration or the like of the vehicle traveling on the road.

As one example, weight position specifier 120 selects, in both captured image A and captured image B, the same point (for example, region 520 in captured image A and region 620 in captured image B) which is not specified as a weight position. Then, displacement amount detector 130 calculates the displacement amount between the selected regions (this displacement amount is hereinafter referred to as a "non-weight position displacement amount"). That is, the non-weight position displacement amount means a displacement amount corresponding to displacement on a non-weight position other than the weight position in the captured image. Weight calculator 170 corrects the displacement amount by subtracting the non-weight position displacement amount from the displacement amount caused between the region corresponding to lowermost point 510 of the tire on road 30 in captured image A and region 610 in captured image B. Thus, the effect of the shake of imaging device 20 can be suppressed. Besides, the effect of the shake of imaging device 20 can be suppressed by a method using an optical image stabilization technology, a method using a mechanical mechanism such as a sensor shift method, etc.

When the displacement amount is detected in the process in step S30, weight calculator 170 specifies a displacement coefficient value corresponding to the weight position specified by weight position specifier 120 (step S40). Specifically, weight calculator 170 specifies the displacement coefficient value corresponding to the weight position specified by weight position specifier 120 by referring to displacement coefficient α (see FIG. 3) stored in storage unit 160.

After the displacement coefficient value is specified, weight calculator 170 calculates the weight by multiplying the specified displacement coefficient value by the displacement amount detected by displacement amount detector 130 (step S50).

After calculating the weight, weight calculator 170 outputs the numerical value of the calculated weight to the outside (step S60). In this case, when the numerical value of the calculated weight is larger than a predetermined reference value, weight calculator 170 may notify the user of this situation, in place of outputting the numerical value of the calculated weight to the outside. In this case, the reference value may be an absolute value or may be a relative value. In addition, for example, when the reference value is more than or equal to 30 times a representative value of a later-described histogram, weight calculator 170 may notify the user of this situation after storing the corresponding captured image. According to this process, weight calculator 170 can notify the user that the vehicle included in the corresponding captured image is relatively likely to be overloaded.

After the process in step S60 is ended, weight measuring device 10 ends the first measurement process.

[1-2-2. First Displacement Coefficient Updating Process]

The first displacement coefficient updating process is a process for updating the displacement coefficient stored in storage unit 160.

Figure 7:
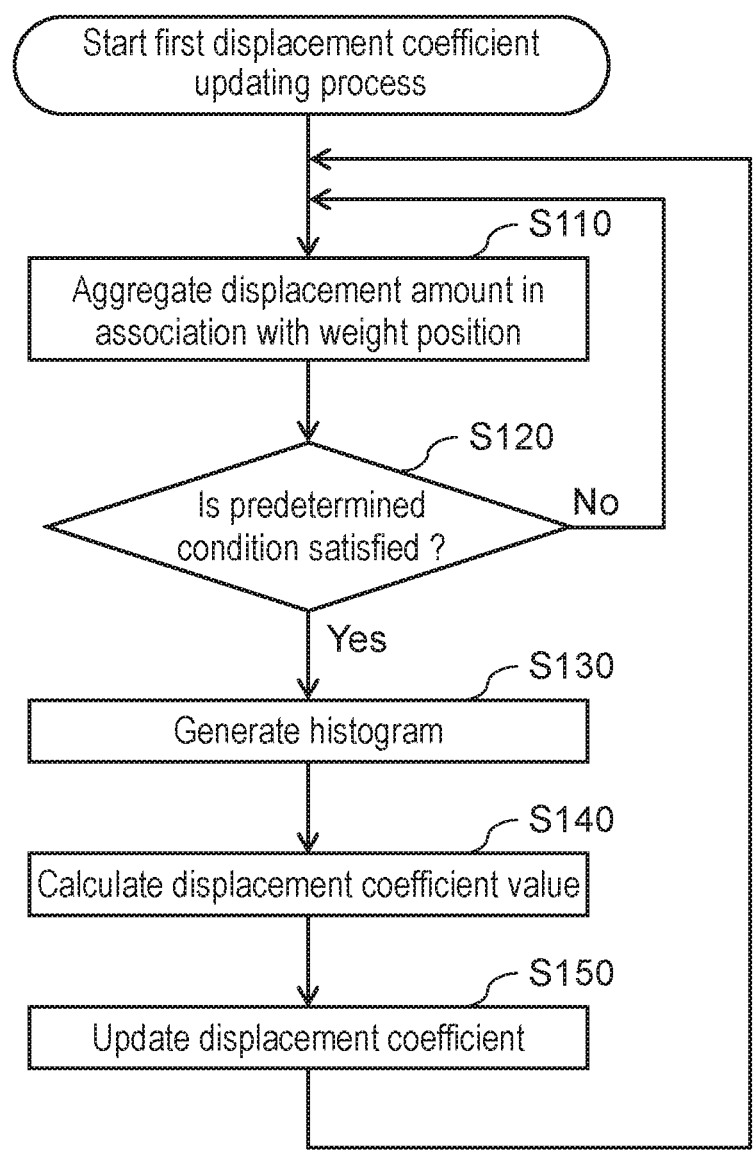
FIG. 7 is a flowchart of a first displacement coefficient updating process.

FIG. 7 is a flowchart of the first displacement coefficient updating process. This first displacement coefficient updating process is started when weight measuring device 10 is activated. When the first displacement coefficient updating process is started, aggregation unit 140 aggregates in such a way that, every time a displacement amount is detected by displacement amount detector 130 with a weight position being specified by weight position specifier 120, the specified weight position and the detected displacement amount are associated with each other (step S110).

Herein, aggregation unit 140 aggregates the detected displacement amounts for each of local regions associated with the displacement coefficient value in the displacement coefficient stored in storage unit 160.

Weight measuring device 10 repeats the processes from No in step S120 to step S110 until a predetermined condition is satisfied in the process in step S120. Herein, the predetermined condition corresponds to the case where a predetermined date has come, the case where a predetermined number of displacement amounts is aggregated, the case where the user performs a predetermined operation to weight measuring device 10, etc.

When the predetermined condition is satisfied in the process in step S120 (Yes in step S120), calculator 150 generates a histogram (displacement amount distribution) of displacement amounts aggregated in a certain period in the past for each local region based on the aggregation result obtained by aggregation unit 140 (step S130).

Figure 8:
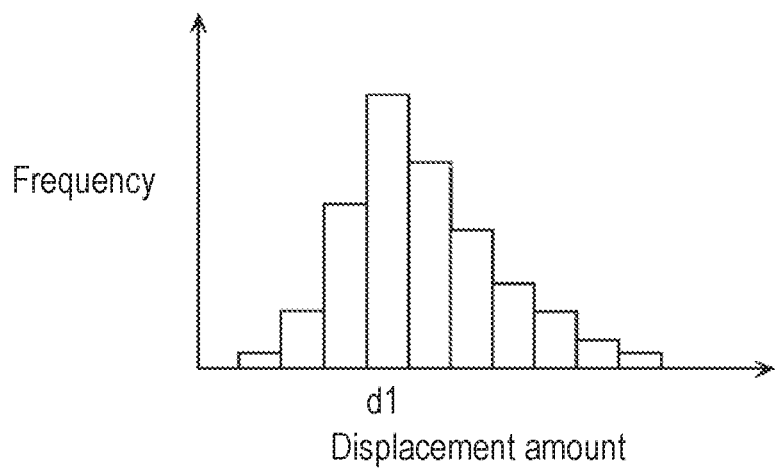
FIG. 8 is a diagram illustrating one example of a histogram generated by a calculator.
Figure 9:
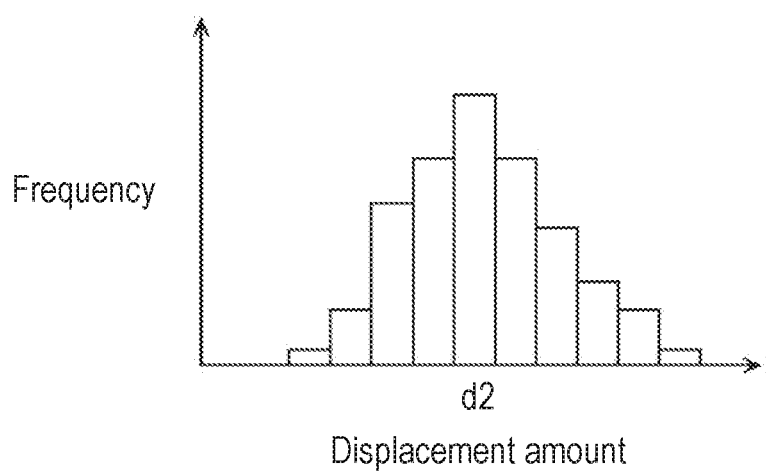
FIG. 9 is a diagram illustrating one example of a histogram generated by the calculator.

Each of FIGS. 8 and 9 is a diagram illustrating one example of the histogram generated by calculator 150 for each local region. Each of FIGS. 8 and 9 illustrates an example of the histogram of the same local region in a different aggregation period. The reason of these histogram shapes being different from each other is considered to be that the road surface temperature is different for each aggregation period, the deterioration state of the road surface is different for each aggregation period, etc.

After the histogram for each local region is generated, calculator 150 calculates a displacement coefficient value of the corresponding local region based on a characteristic of the histogram and the second information stored in weight storage unit 180 (step S140). The characteristic of the histogram indicates a representative value of the displacement amount obtained from the histogram shape, such as the average, the mode, the maximum, the minimum, or the average of the lower levels with a certain fraction. The present exemplary embodiment describes, as one example, the case where the mode of the histogram is used as the characteristic of the histogram.

Weight storage unit 180 stores, as the second information, a weight of a vehicle model whose amount of traffic is the highest on road 30.

Calculator 150 calculates the displacement coefficient value by dividing the weight of the vehicle model whose amount of traffic is the highest on road 30 by the mode which is the representative value of the displacement amount obtained from the histogram shape.

For example, if the weight of the vehicle model whose amount of traffic is the highest is w1, and the histogram generated by calculator 150 is the one illustrated in FIG. 8, calculator 150 calculates displacement coefficient value α1 based on equation 1 below.

$$\alpha 1 = w1/d1 \quad (1)$$

In this equation, d1 is the mode of the displacement amount in the histogram in FIG. 8.

For example, if the weight of the vehicle model which has the highest percentage among traveling vehicles is w1, and the histogram generated by calculator 150 is the one illustrated in FIG. 9, calculator 150 calculates displacement coefficient value α2 based on equation 2 below.

$$\alpha 2 = w1/d2 \quad (2)$$

In this equation, d2 is the mode of the histogram in FIG. 9.

It is to be noted that, if the expected characteristic of the histogram cannot appropriately be obtained, such as the case where the precision of the histogram is low because of the number of traveling vehicles being a few (for example, lower than or equal to a certain number), the case where the histogram has a plurality of modes, etc., calculator 150 may calculate the displacement coefficient value by using a substitute value. For example, calculator 150 may use a displacement coefficient value in the past time period or may continuously use the displacement coefficient value which has been used before updating the histogram, as the substitute value.

If displacement coefficient α is dependent on a vehicle speed, calculator 150 may calculate vehicle speed v of the vehicle from an amount of movement of the vehicle in captured images continuously captured in a time-series manner, and may calculate displacement coefficient α(v) for each vehicle speed v. Further, calculator 150 may update the histogram or may calculate the displacement coefficient value only when the vehicle speed is within a certain range (for example, only when vehicle speed v<20 Km/h).

When the displacement coefficient value is calculated in the process in step S140, calculator 150 overwrites the displacement coefficient stored in storage unit 160 by using the calculated displacement coefficient value, thereby updating the displacement coefficient (step S150).

After the process in step S150 is ended, weight measuring device 10 proceeds again to the process in step S110, and repeats the processes in step S110 and subsequent steps.

[1-3. Effects, Etc.]

As described above, weight measuring device 10 calculates the weight of vehicle 40 traveling on road 30, in a non-contact manner, from the captured image captured by external imaging device 20.

Therefore, when weight measuring device 10 is installed, it is unnecessary to embed sensors, required for weight measurement, in road 30. Accordingly, when weight measuring device 10 is used, installment, removal, and updating of a measuring system for measuring a vehicle weight can relatively easily be achieved.

In addition, by means of using an image, the weight can be measured with relatively high precision, in consideration of an effect caused by the vehicle speed.

Furthermore, calculator 150 automatically updates the displacement coefficient stored in storage unit 160, whereby cost and labor taken for the maintenance and management of the measuring system using weight measuring device 10 can be reduced.

Second Exemplary Embodiment

Herein, a weight measuring device according to a second exemplary embodiment configured by modifying a portion of the configuration of weight measuring device 10 in the first exemplary embodiment will be described as one aspect of the present disclosure.

Weight measuring device 10 according to the first exemplary embodiment is an example of the configuration in which displacement amount detector 130 detects a displacement amount corresponding to displacement caused on any location on road 30. On the other hand, the weight measuring device according to the second exemplary embodiment is an example of the configuration in which a displacement amount detector detects a displacement amount corresponding to displacement caused only within a designated detection range designated in advance in road 30.

Hereafter, the detail of this weight measuring device will be described with reference to the drawings, focusing on differences from weight measuring device 10 in the first exemplary embodiment.

[2-1. Configuration]

Figure 10:
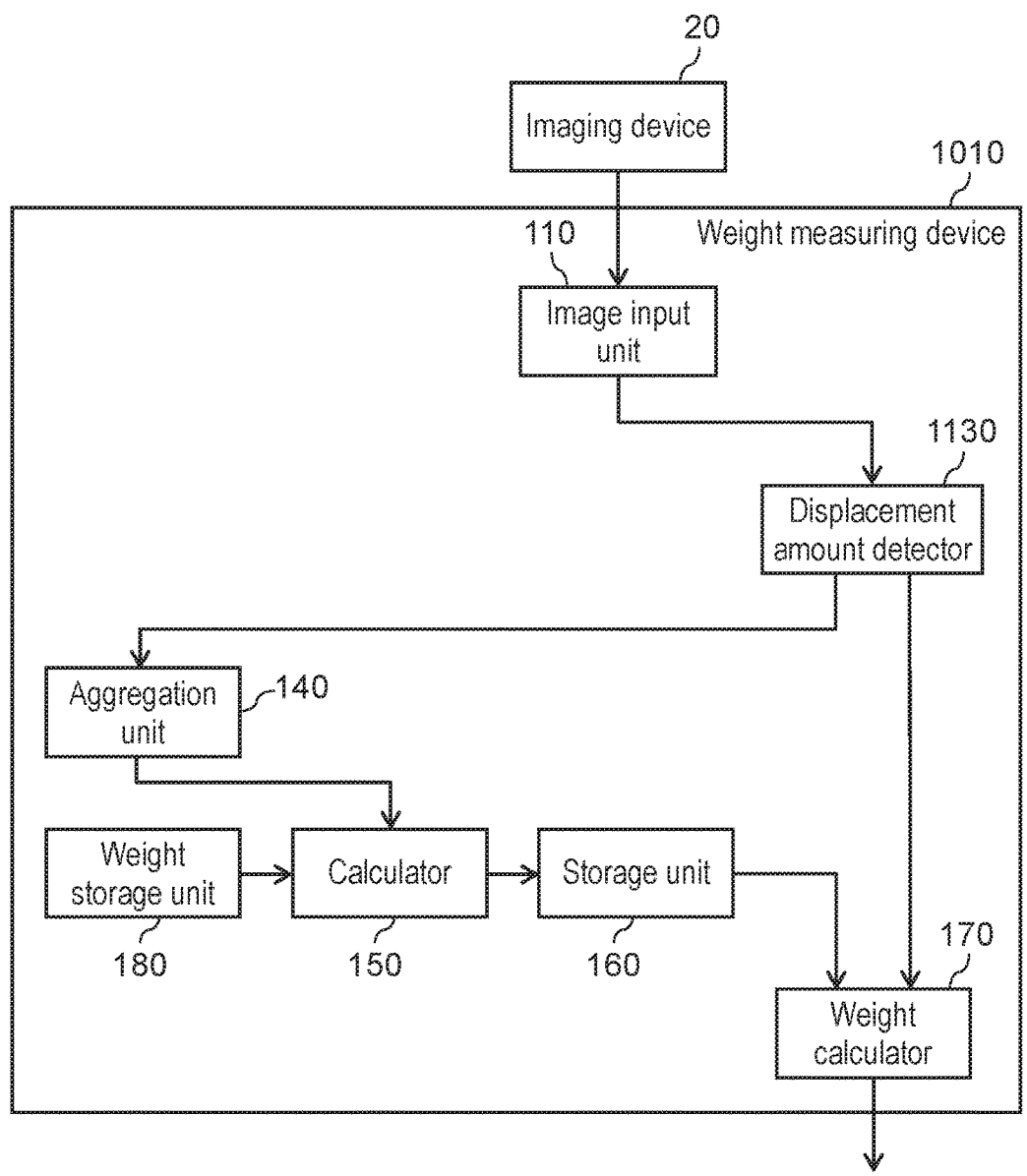
FIG. 10 is a block diagram illustrating a configuration of a weight measuring device.

FIG. 10 is a block diagram illustrating a configuration of weight measuring device 1010 in the second exemplary embodiment. As illustrated in FIG. 10, weight measuring device 1010 is different from weight measuring device 10 (see FIG. 2) in the first exemplary embodiment in the following points. Weight measuring device 1010 does not include weight position specifier 120. Weight measuring device 1010 includes displacement amount detector 1130 in place of displacement amount detector 130. Therefore, displacement amount detector 1130 will mainly be described here.

Displacement amount detector 1130 detects a displacement amount corresponding to displacement caused in a designated range (corresponding to region 630 in FIG. 6, for example) which is designated in advance in a road, from a plurality of captured images obtained by capturing the road for a vehicle. Specifically, displacement amount detector 1130 detects the displacement amount corresponding to the displacement by comparing a captured image in which displacement does not occur in the designated range which is designated in advance in the road and a captured image in which displacement occurs in the designated range, from among the captured images received by image input unit 110.

The operation of weight measuring device 1010 having the above-mentioned configuration will be described with reference to the drawings hereafter.

[2-2. Operation]

Weight measuring device 1010 performs, as its characteristic operation, a second measurement process configured by modifying a portion of the first measurement process in the first exemplary embodiment.

[2-2-1. Second Measurement Process]

Figure 11:
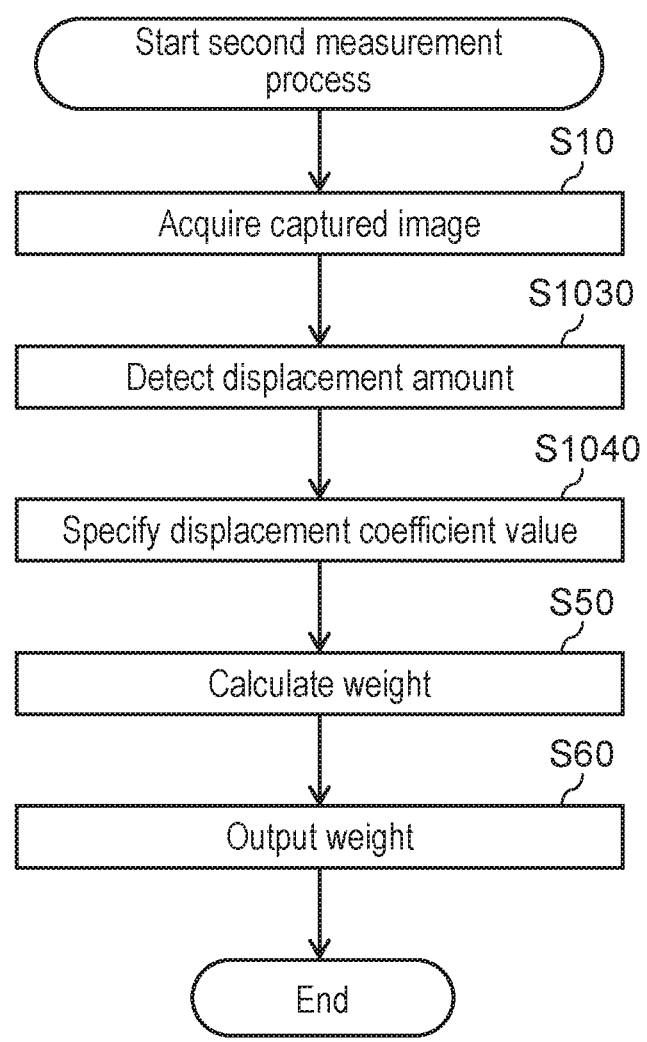
FIG. 11 is a flowchart of a second measurement process.

FIG. 11 is a flowchart of the second measurement process. The second measurement process is started when a captured image (this captured image is referred to as "captured image C" hereinafter) including a vehicle which causes displacement in the designated range designated in advance in the road is input to image input unit 110.

In FIG. 11, the second measurement process is different from the first measurement process (see FIG. 4) in the first exemplary embodiment in the following points. The second measurement process does not include the process in step S20. The second measurement process includes a process in step S1030 in place of the process in step S30, and includes a process in step S1040 in place of the process in step S40. Therefore, the process in step S1030 and the process in step S1040 will mainly be described here.

After the process in step S10 is ended, displacement amount detector 1130 detects a displacement amount corresponding to displacement caused within the designated range designated in advance in the road (step S1030). The detection of the displacement amount uses captured image C and captured image B in which displacement does not occur from among the captured images acquired by image input unit 110. If captured image B is not acquired by image input unit 110 before the weight position is specified, displacement amount detector 1130 waits until captured image B is acquired by image input unit 110, and then, detects the displacement amount.

When displacement amount detection is not normally performed due to, for example, designated range designated in advance in the road being covered by a vehicle traveling in front of the designated range, displacement amount detector 1130 may determine that the displacement amount detection is impossible and may not perform the displacement amount detection. Displacement amount detector 1130 may determine that it is unable to perform the displacement detection, if a matching evaluation value or correlation value falls below a predetermined reference by performing block matching or a correlation method, for example. Alternatively, displacement amount detector 1130 may determine that the designated range is covered by performing a difference process with a background image. Still alternatively, displacement amount detector 1130 may also determine that, if the detected displacement amount exceeds a limited value, normal detection ends in failure and may decide not to perform the subsequent processes.

When the displacement amount is detected in the process in step S1030, weight calculator 170 specifies a displacement coefficient value corresponding to the position in the designated range designated in advance in the road (step S1040). Specifically, weight calculator 170 specifies the displacement coefficient value corresponding to the position in the designated range designated in advance in the road by referring to displacement coefficient α (see FIG. 3) stored in storage unit 160.

After the displacement coefficient value is specified, weight measuring device 1010 proceeds to the process in step S50, and performs the subsequent processes.

[2-3. Effects, Etc.]

As described above, weight measuring device 1010 detects the displacement amount corresponding to the displacement caused only within the designated detection range which is designated in advance in the road. On the other hand, weight measuring device 1010 does not specify a weight position.

Therefore, weight measuring device 1010 can execute the second measurement process with a processing amount less than the first measurement process performed by weight measuring device 10 in the first exemplary embodiment.

From the above, weight measuring device 1010 is effective to be used for the case where a region, which is a target from which a weight is to be measured, in a captured image is relatively narrow.

Third Exemplary Embodiment

Herein, a weight measuring device according to a third exemplary embodiment configured by modifying a portion of the configuration of weight measuring device 10 in the first exemplary embodiment will be described as one aspect of the present disclosure.

Weight measuring device 10 in the first exemplary embodiment is an example of the configuration for measuring, when there is only one captured image including a certain vehicle, a weight of the vehicle by using the one captured image. On the other hand, the weight measuring device in the third exemplary embodiment is an example of the configuration for measuring, when there is a plurality of captured images including a certain vehicle, a weight of the vehicle by using these captured images.

Hereafter, the detail of this weight measuring device will be described with reference to the drawings, focusing on differences from weight measuring device 10 in the first exemplary embodiment.

[3-1. Configuration]

Figure 12:
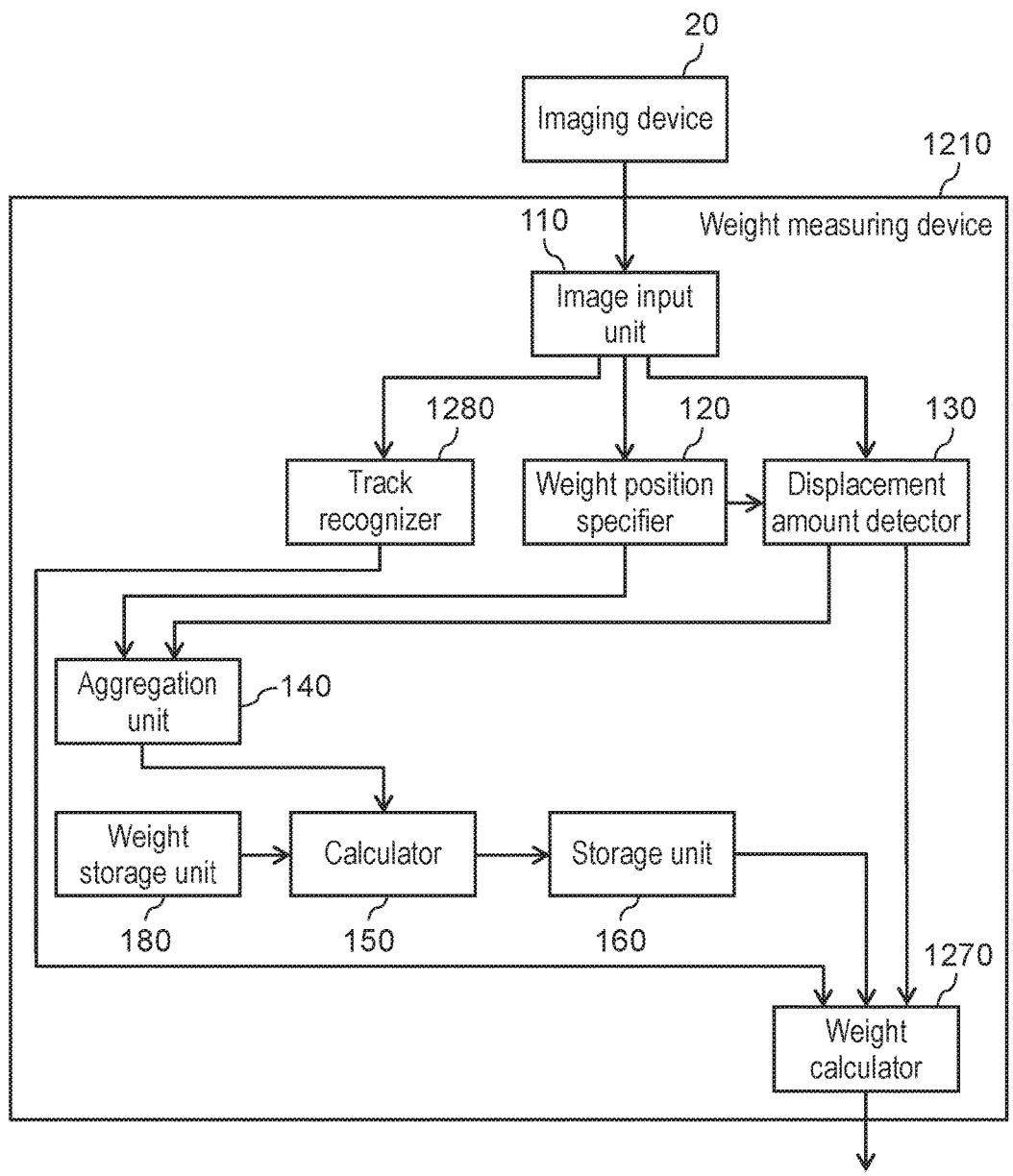
FIG. 12 is a block diagram illustrating a configuration of a weight measuring device.

FIG. 12 is a block diagram illustrating a configuration of weight measuring device 1210 in the third exemplary embodiment.

As illustrated in FIG. 12, weight measuring device 1210 is different from weight measuring device 10 (see FIG. 2) in the first exemplary embodiment in the following points. Weight measuring device 1210 further includes track recognizer 1280. Weight measuring device 1210 includes weight calculator 1270 in place of weight calculator 170. Therefore, track recognizer 1280 and weight calculator 1270 will mainly be described here.

Track recognizer 1280 recognizes a vehicle captured as a second captured image at a time different from a time at which the vehicle is captured as a first captured image. More specifically, track recognizer 1280 recognizes the same vehicle included in a plurality of captured images continuously captured at intervals by performing an image recognition process.

Weight calculator 1270 has the following tracking function in addition to the function of weight calculator 170 in the first exemplary embodiment. Weight calculator 1270 calculates the weight of the vehicle based on both a first displacement amount and a second displacement amount, when track recognizer 1280 recognizes, in the second captured image, the vehicle captured in the first captured image. Herein, the first displacement amount is a displacement amount, in the first captured image, corresponding to displacement caused on the road by application of the weight of the vehicle. In addition, the second displacement amount is a displacement amount, in the second captured image, corresponding to displacement caused on the road by application of the weight of the vehicle.

More specifically, when the same vehicle is recognized in the plurality of captured images, weight calculator 1270 calculates the weight of the vehicle (hereinafter referred to as a "statistical weight"), according to a predetermined statistical method, by using a plurality of displacement amounts which is detected in the respective images and corresponds to displacement caused by application of the weight of the vehicle.

The operation of weight measuring device 1210 having the above-mentioned configuration will be described with reference to the drawings hereafter.

[3-2. Operation]

Weight measuring device 1210 performs, as its characteristic operation, a third measurement process configured by modifying a portion of the first measurement process in the first exemplary embodiment.

[3-2-1. Third Measurement Process]

Figure 13:
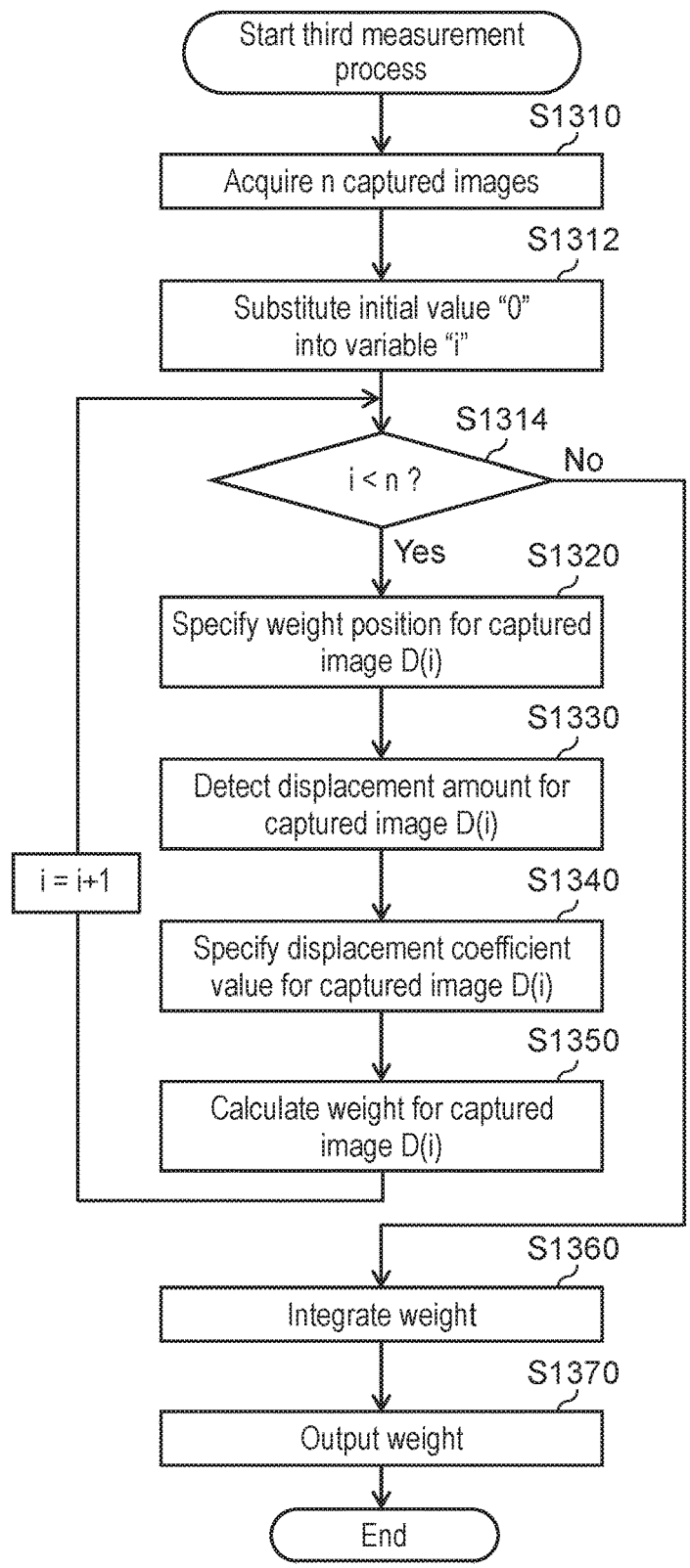
FIG. 13 is a flowchart of a third measurement process.

FIG. 13 is a flowchart of a third measurement process. This third measurement process is started when a plurality of captured images which include the same vehicle and are continuously captured at intervals are input to image input unit 110.

It is described here that the number of captured images including the same vehicle and continuously captured at intervals is n (n is an integer greater than or equal to two). Further, each of the captured images is also referred to as captured image D(i) corresponding to variable "i".

In FIG. 13, the processes in steps S1320 to S1350 are those in which the processes in steps S20 to S50 in the first exemplary embodiment are performed on captured image D(i). Therefore, the processes in steps S1310 to S1314 and the processes in steps S1360 to S1370 will mainly be described here.

When the third measurement process is started, image input unit 110 acquires n captured images which are input from imaging device 20, include the same vehicle, and are continuously captured at intervals (step S1310).

When n captured images are acquired, weight calculator 1270 substitutes an initial value "0" into variable "i" (step S1312). Then, weight calculator 1270 determines whether or not the value of variable "i" is smaller than "n" (step S1314).

When the value of variable "i" is smaller than "n" in the process in step S1320 (Yes in step S1314), weight measuring device 1210 performs the processes in steps S1320 to S1350 on captured image D(i).

After the process in step S1350 is ended, weight calculator 1270 adds "1" to variable "i", and returns back to the process in step S1314.

When the value of variable "i" is not smaller than "n" in the process in step S1320 (No in step S1314), weight calculator 1270 integrates the calculated weights for the n captured images to calculate the statistical weight of the vehicle (step S1360). As the specific example of the integration method, it is considered to calculate an average, a median value, a mode, etc., for example.

After calculating the statistical weight, weight calculator 1270 outputs the numerical value of the calculated statistical weight to the outside as the weight of the vehicle (step S1370).

After the process in step S1370 is ended, weight measuring device 1210 ends the third measurement process.

[3-3. Effects, Etc.]

As described above, weight measuring device 1210 calculates n weights for the same vehicle. Weight measuring device 1210 then calculates the statistical weight by integrating n weights. Therefore, the precision in weight calculation can be improved. In addition, detection failure caused by the designated range being covered can be reduced. Further, information of the number of passing vehicles can be obtained.

Fourth Exemplary Embodiment

Herein, a weight measuring device according to a fourth exemplary embodiment configured by modifying a portion of the configuration of weight measuring device 10 in the first exemplary embodiment will be described as one aspect of the present disclosure.

Weight measuring device 10 in the first exemplary embodiment is an example of the configuration for calculating a displacement coefficient value based on the aggregation result of displacement amounts and updating the displacement coefficient stored in storage unit 160 by using the calculated displacement coefficient value. On the other hand, the weight measuring device according to the fourth exemplary embodiment is an example of a configuration for calculating a displacement coefficient value based on a displacement amount corresponding to displacement caused by a predetermined specific vehicle and a weight of the specific vehicle stored in advance, and updating the displacement coefficient stored in storage unit 160 by using the calculated displacement coefficient value.

Hereafter, the detail of this weight measuring device will be described with reference to the drawings, focusing on differences from weight measuring device 10 in the first exemplary embodiment.

[4-1. Configuration]

Figure 14:
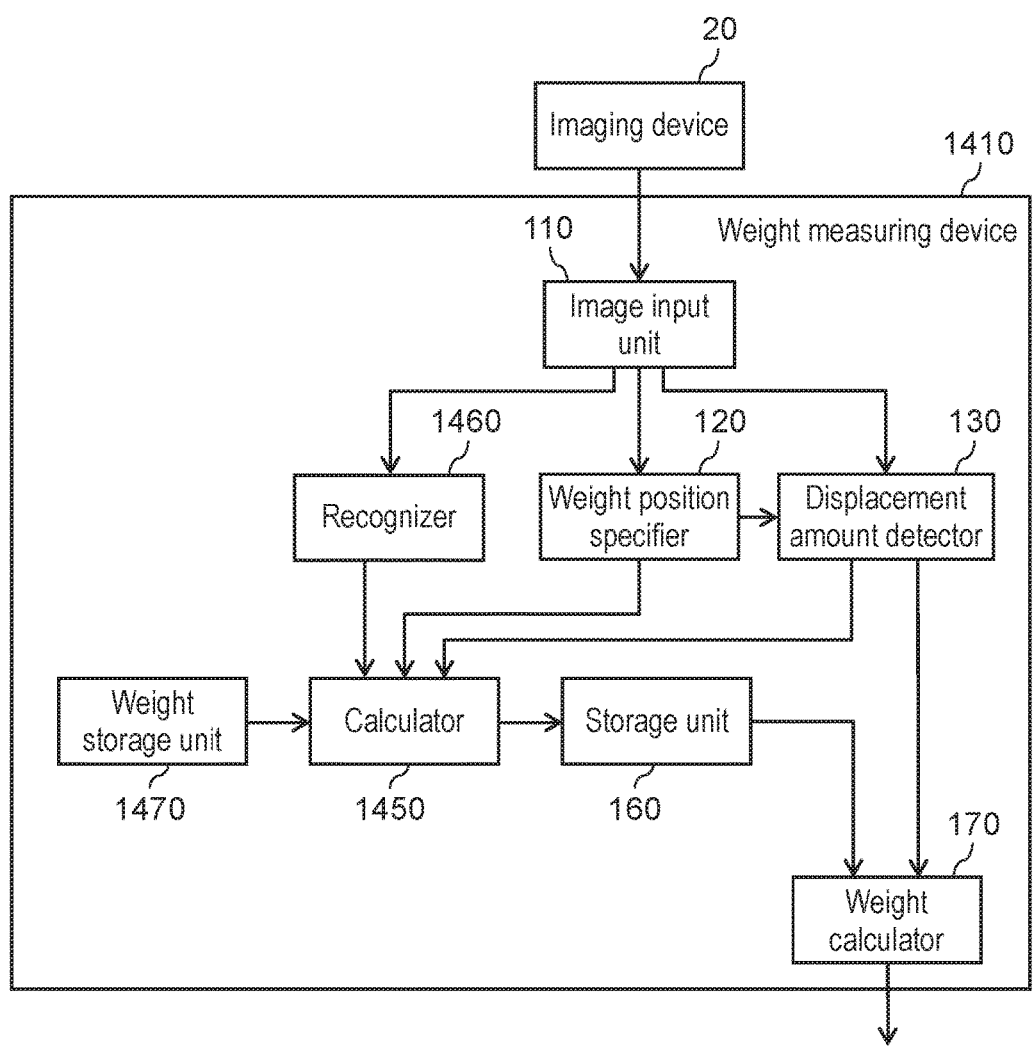
FIG. 14 is a block diagram illustrating a configuration of a weight measuring device.

FIG. 14 is a block diagram illustrating a configuration of weight measuring device 1410 in the fourth exemplary embodiment. As illustrated in FIG. 14, weight measuring device 1410 is different from weight measuring device 10 (see FIG. 2) in the first exemplary embodiment in the following points. Weight measuring device 1410 further includes recognizer 1460 without including aggregation unit 140. Weight measuring device 1410 includes calculator 1450 in place of calculator 150, and includes weight storage unit 1470 in place of weight storage unit 180. Therefore, recognizer 1460, weight storage unit 1470, and calculator 1450 will mainly be described here.

Recognizer 1460 recognizes a specific vehicle using a captured image. More specifically, recognizer 1460 stores features of the specific vehicle, and recognizes the specific vehicle included in captured images by performing an image recognition process on these captured images by using the stored features. Herein, the specific vehicle is desirably a vehicle of a type having less variation in weight due to loaded articles or the like. In addition, it is desirable that recognizer 1460 stores features of specific vehicles of a plurality of types, each having a different weight, so as to be able to recognize the specific vehicles of the plurality of types. Further, the specific vehicle is a vehicle of a type having a relatively high frequency of passing through a target road.

Weight storage unit 1470 stores the weight of the specific vehicle as second information. Weight storage unit 1470 may be implemented by a memory (not illustrated) constituting weight measuring device 1410 or a database of an external device which can perform communication.

When recognizer 1460 recognizes the specific vehicle and displacement amount detector 130 detects a displacement amount corresponding to displacement caused on the road by application of the weight of the specific vehicle, calculator 1450 calculates a displacement coefficient based on the displacement amount and the weight of the specific vehicle stored in weight storage unit 1470. Then, calculator 1450 overwrites the displacement coefficient stored in storage unit 160 by using the calculated displacement coefficient to update the displacement coefficient. Specifically, when the displacement amount is defined as d2 and the weight of the specific vehicle is defined as w2, calculator 1450 calculates displacement coefficient value α2 of the displacement coefficient based on following equation 3.

$$\alpha 2 = w2/d2 \qquad (3)$$

Then, calculator 1450 overwrites the displacement coefficient stored in storage unit 160 by using calculated displacement coefficient value α2.

The operation of weight measuring device 1410 having the above-mentioned configuration will be described with reference to the drawings hereafter.

[4-2. Operation]

Weight measuring device 1410 performs, as its characteristic operation, a second displacement coefficient updating process configured by modifying a portion of the first displacement coefficient updating process in the first exemplary embodiment.

[4-2-1. Second Displacement Coefficient Updating Process]

Figure 15:
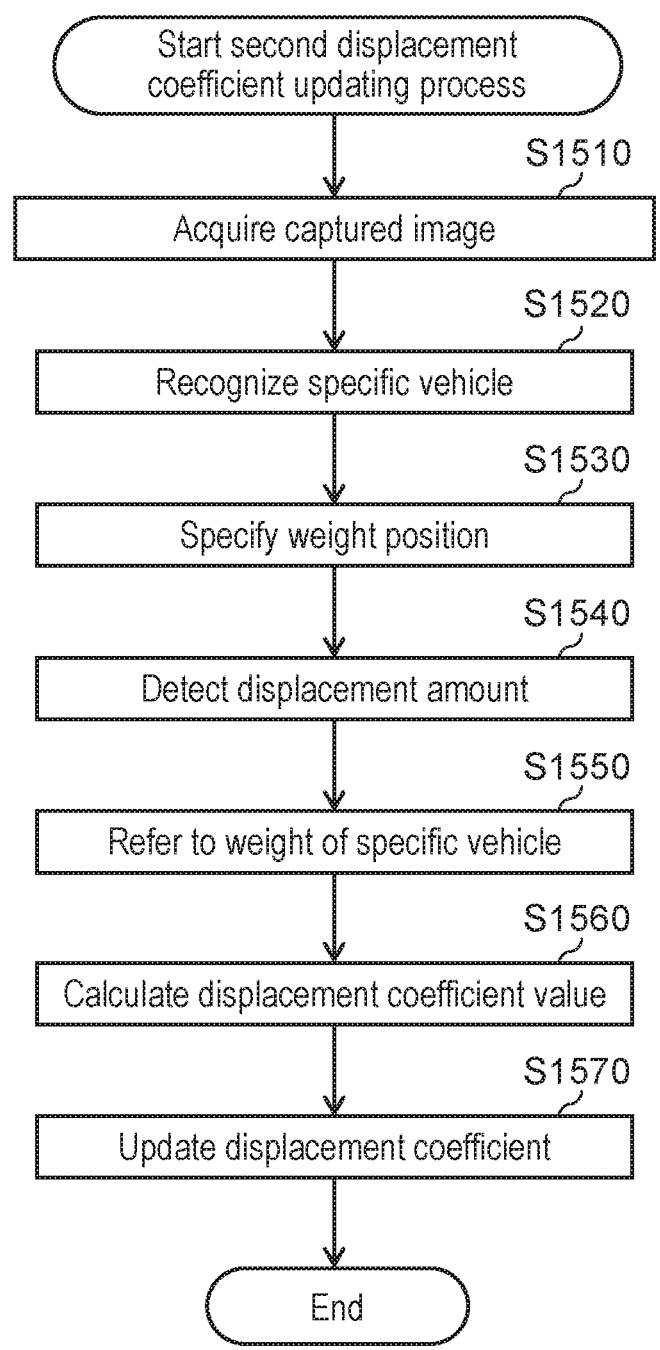
FIG. 15 is a flowchart of a second displacement coefficient updating process.

FIG. 15 is a flowchart of the second displacement coefficient updating process. This second displacement coefficient updating process is started when a captured image including a specific vehicle (this captured image is hereinafter referred to as "captured image F") is input to image input unit 110.

When the second displacement coefficient updating process is started, image input unit 110 acquires captured image F input from imaging device 20 (step S1510). After captured image F is acquired, recognizer 1460 recognizes the specific vehicle from captured image F (step S1520).

When the specific vehicle is recognized, weight position specifier 120 specifies a weight position of the specific vehicle (step S1530). When the weight position is specified, displacement amount detector 130 detects a displacement amount corresponding to displacement caused on the specified weight position on the road (step S1540).

When the displacement amount is detected, calculator 1450 refers to the weight of the specific vehicle stored in weight storage unit 1470 (step S1550). Then, calculator 1450 calculates a displacement coefficient value corresponding to the weight position specified by weight position specifier 120 based on the detected displacement amount and the weight which has been referred to (step S1560).

After calculating the displacement coefficient value, calculator 1450 overwrites the displacement coefficient stored in storage unit 160 by using the calculated displacement coefficient value, thereby updating the displacement coefficient (step S1570).

After the process in step S1570 is ended, weight measuring device 1410 ends the second displacement coefficient updating process.

[4-3. Effects, Etc.]

As described above, weight measuring device 1410 updates the displacement coefficient by using the captured image including the specific vehicle. According to this configuration, if the captured image including the specific vehicle can be acquired, the displacement coefficient can be updated, even when the number of vehicles traveling on the target road is relatively small. Further, because a precise weight can be used, the precision in weight calculation can be improved.

Fifth Exemplary Embodiment

Herein, a displacement coefficient calculating device according to a fifth exemplary embodiment configured by modifying a portion of the configuration of weight measuring device 10 in the first exemplary embodiment will be described as one aspect of the present disclosure.

Weight measuring device 10 in the first exemplary embodiment is an example of the configuration for calculating a displacement coefficient value based on the aggregation result of displacement amounts and updating the displacement coefficient stored in storage unit 160 by using the calculated displacement coefficient value. On the other hand, the displacement coefficient calculating device in the fifth exemplary embodiment is an example of a configuration for determining, when updating the displacement coefficient, whether the displacement coefficient is normal or abnormal, generating an image indicating the determination result, and displaying this image as being superimposed on a captured image.

Hereafter, the detail of this displacement coefficient calculating device will be described with reference to the drawings, focusing on differences from weight measuring device 10 in the first exemplary embodiment.

[5-1. Configuration]

Figure 16:
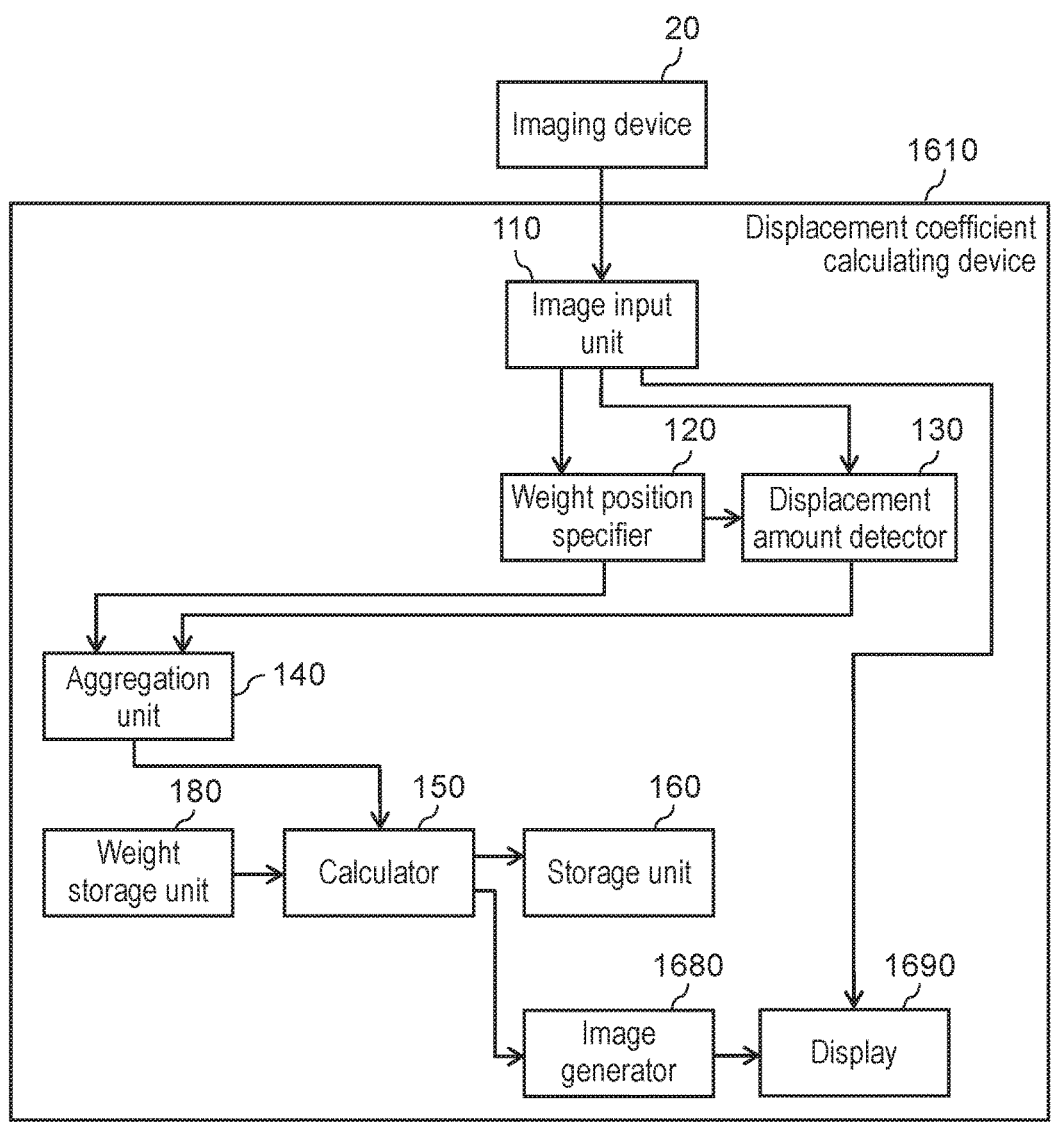
FIG. 16 is a block diagram illustrating a configuration of a displacement coefficient calculating device.

FIG. 16 is a block diagram illustrating a configuration of displacement coefficient calculating device 1610 in the fifth exemplary embodiment.

As illustrated in FIG. 16, displacement coefficient calculating device 1610 is different from weight measuring device 10 (see FIG. 2) in the first exemplary embodiment in the following points. Displacement coefficient calculating device 1610 does not include weight calculator 170. Displacement coefficient calculating device 1610 further includes image generator 1680 and display 1690. Therefore, image generator 1680 and display 1690 will be mainly described here.

Image generator 1680 generates an image based on the displacement coefficient calculated by calculator 150. More specifically, when calculator 150 newly updates the displacement coefficient stored in storage unit 160, image generator 1680 determines whether the displacement coefficient value included in the displacement coefficient to be updated is normal or abnormal, and generates an image (this image is referred to as "image for superimposition" hereinafter) which indicates the determination result and is displayed as being superimposed on the captured image.

For example, image generator 1680 may determine that each displacement coefficient value is normal or abnormal by determining, through comparison with a predetermined reference displacement coefficient value, whether each displacement coefficient value deviates from the reference displacement coefficient value by at least a predetermined amount or at least a predetermined fraction. Alternatively, image generator 1680 may determine that each displacement coefficient is normal or abnormal by determining, through comparison with each displacement coefficient value of displacement coefficients having been updated on the same date or the same time period in the past, whether each displacement coefficient value deviates from the displacement coefficient value by at least a predetermined amount or at least a predetermined fraction, for example. Alternatively, image generator 1680 may determine that each displacement coefficient is normal or abnormal by determining whether each displacement coefficient value deviates from a variation range of each displacement coefficient in a certain period (for example, in one day or in one week) by at least a predetermined amount or at least a predetermined fraction, for example. Alternatively, image generator 1680 may determine that each displacement coefficient value is normal or abnormal by determining, through comparison with displacement coefficient values on the peripheral regions, whether each displacement coefficient value deviates from these displacement coefficient values, the average of these displacement coefficient values, or the mode of these displacement coefficient values by at least a predetermined amount or at least a predetermined fraction, for example.

Figure 17:
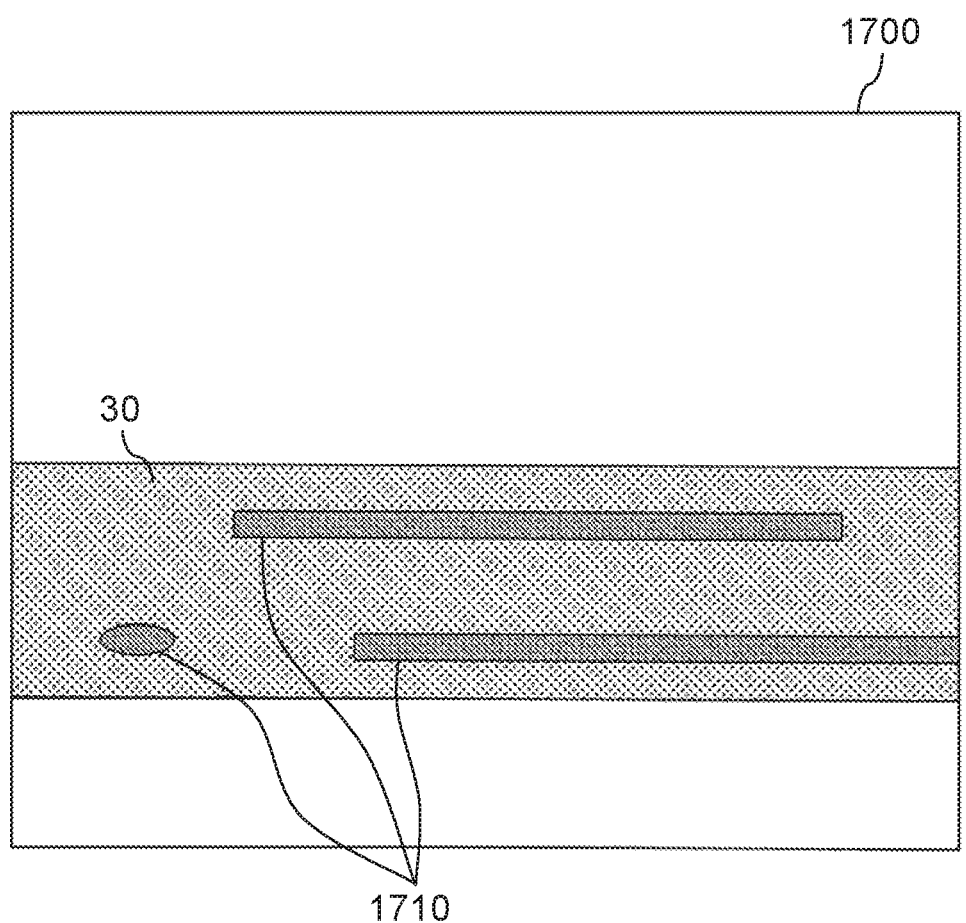
FIG. 17 is a view illustrating one example of a superimposed image.

FIG. 17 is a view illustrating an image (this image is referred to as a "superimposed image" hereinafter) in which the image for superimposition generated by image generator 1680 is superimposed on captured image B illustrated in FIG. 6.

In FIG. 17, the image for superimposition includes region 1710 which is only colored with other regions being transparent. Therefore, in superimposed image 1700, the color of the portion of region 1710 is overpainted relative to captured image B.

Region 1710 is an aggregate of local regions corresponding to displacement coefficient values determined to be abnormal by image generator 1680. Region 1710 is painted in red to call user's attention, for example.

Herein, in the image for superimposition, the regions corresponding to the displacement coefficient values determined to be abnormal are painted in a single color (red). However, the image may be generated such that each region is displayed by changing colors according to the degree of deviation, or such that each region is displayed with gradation expression of luminance according to the degree of deviation. In addition, image generator 1680 may generate a new image for superimposition and a new captured image to be superimposed on the new image for superimposition by converting a viewpoint for the image for superimposition and the captured image to be superimposed on the image for superimposition such that the road is viewed from directly above. This configuration enables a user using displacement coefficient calculating device 1610 to relatively easily recognize positions of the regions which have been determined to be abnormal.

In FIG. 16, display 1690 displays the image generated by image generator 1680 as being superimposed on at least one captured image. Specifically, display 1690 has a liquid crystal display (not illustrated) for displaying an image, for example, and displays, on the liquid crystal display, the image generated by image generator 1680 as being superimposed on at least one (for example, captured image B) of captured images acquired by image input unit 110.

The operation of displacement coefficient calculating device 1610 having the above-mentioned configuration will be described with reference to the drawings hereafter.

[5-2. Operation]

Displacement coefficient calculating device 1610 performs, as its characteristic operation, a superimposition display process in addition to the first measurement process in the first exemplary embodiment.

[5-2-1. Superimposition Display Process]

The superimposition display process is a process in which, when calculator 150 newly updates the displacement coefficient stored in storage unit 160, image generator 1680 determines whether each displacement coefficient value included in the displacement coefficient to be updated is normal or abnormal, and displays an image indicating the determination result as being superimposed on the captured image.

Figure 18:
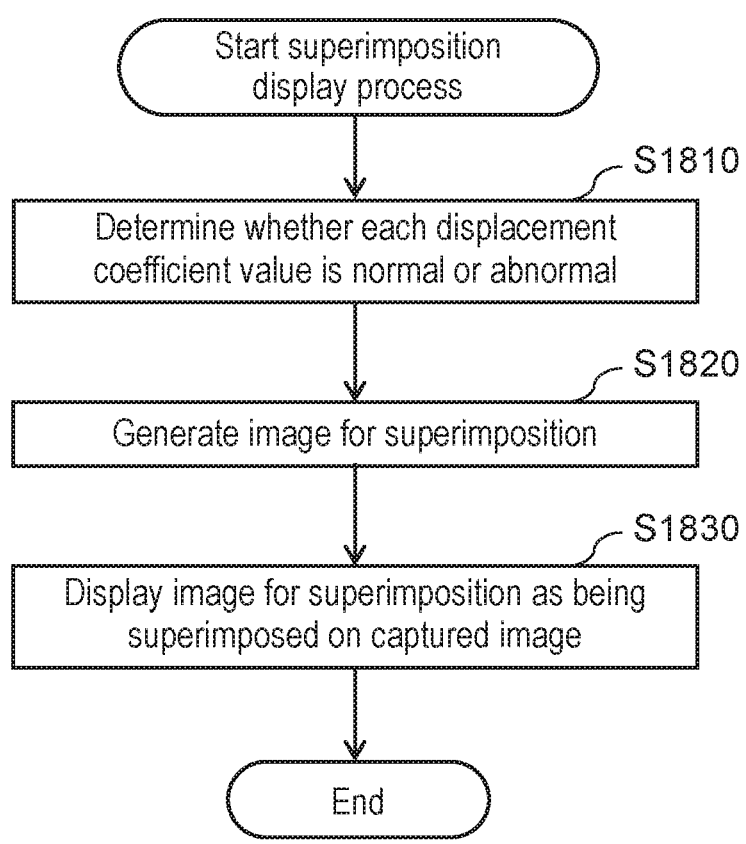
FIG. 18 is a flowchart of a superimposition display process.

FIG. 18 is a flowchart of the superimposition display process. This superimposition display process is started when the process in step S150 in the first displacement coefficient updating process (see FIG. 7) is executed.

When the superimposition display process is started, image generator 1680 determines whether each displacement coefficient value included in the displacement coefficient to be newly updated in the process in step S150 is normal or abnormal (step S1810).

After determining whether each displacement coefficient value is normal or abnormal, image generator 1680 generates an image for superimposition which indicates the determination result and which is to be displayed as being superimposed on the captured image (step S1820).

When the image for superimposition is generated, display 1690 selects one of the captured images acquired by image input unit 110, and displays the generated image for superimposition as being superimposed on the selected captured image.

[5-3. Effects, Etc.]

As described above, displacement coefficient calculating device 1610 determines, when updating a displacement coefficient, whether the displacement coefficient is normal or abnormal, and displays the determination result as being superimposed on a captured image. According to this configuration, a user using displacement coefficient calculating device 1610 can visually recognize a deterioration state of the road. In addition, whether the displacement coefficient is normal or abnormal is automatically determined, whereby cost and labor taken for repair or maintenance of the road can be reduced.

Other Exemplary Embodiments

As described above, the first to fifth exemplary embodiments have been described as an illustration of the technology disclosed in the present application. However, the technology in the present disclosure is not limited to those, and can be also applied to exemplary embodiments that are changed, replaced, added, omitted, or the like.

(1) The first exemplary embodiment has been described that weight measuring device 10 is an example of the configuration provided with image input unit 110 receiving an input of a captured image captured by imaging device 20. However, weight measuring device 10 is not necessarily provided with image input unit 110, so long as it can acquire the captured image. For example, weight measuring device 10 may include an imaging unit for capturing a captured image, in place of image input unit 110. Further, the captured image used by weight position specifier 120 may be the captured image captured by the imaging unit. This configuration eliminates the need of the external imaging device.

(2) The first exemplary embodiment has been described that weight measuring device 10 is an example of the configuration implemented in such a way that a microprocessor (not illustrated) in a computer (not illustrated) provided with the microprocessor and a memory (not illustrated) executes a program stored in the memory. However, weight measuring device 10 is not necessarily limited to the configuration example implemented as per the implementation example described above, so long as it has a function equivalent to the function in the implementation example described above. For example, weight measuring device 10 may be an example of the configuration in which a portion of or all of components constituting weight measuring device 10 are implemented by a dedicated circuit.

(3) The first exemplary embodiment has been described that weight measuring device 10 is an example of the configuration for recognizing a tire of a vehicle by an image process and specifying a region on the road corresponding to the lowermost point of the tire as a weight position. However, the method for specifying the weight position is not necessarily limited to the above-mentioned method. For example, weight measuring device 10 may specify a position where a displacement amount locally becomes the maximum as a weight position.

(4) The first exemplary embodiment has been described that the local region for the displacement coefficient has a size of 10 pixels in height and 10 pixels in width. However, the size and shape of the local region are not limited to the size and shape described above. For example, the local region may be five pixels in height and 15 pixels in width.

(5) The first exemplary embodiment has been described that weight measuring device 10 is an example of the configuration in which weight calculator 170 calculates weight w by multiplying displacement amount d detected by displacement amount detector 130 by the displacement coefficient value corresponding to the region including the weight position specified by weight position specifier 120. However, the configuration is not necessarily limited to calculating the weight by the calculation method described above, so long as the weight can be calculated based on displacement amount d detected by displacement amount detector 130 and the information stored in storage unit 160. For example, weight measuring device 10 may be an example of the configuration in which storage unit 160 stores a table indicating the relation between displacement amount d and weight w, and weight calculator 170 calculates weight w based on displacement amount d detected by displacement amount detector 130 by referring to the table.

(6) The third exemplary embodiment has been described that weight measuring device 1210 is an example of the configuration for acquiring n captured images in the process in step S1310 in the third measurement process. However, it is not necessary that the acquisition of n captured images is completed in the process in step S1310 before the process in step S1312 is started, so long as the acquisition of captured image D(i) which is a target to be processed is completed at the timing at which the process in each step S1320 in the loop is started. For example, weight measuring device 1210 may be an example of the configuration in which the processes in step S1312 and subsequent steps are started even if the acquisition of all of n captured images is not completed in the process in step S1310, and weight measuring device 1210 waits until captured image D(i) which is the target to be processed is acquired at the timing at which the process in each step S1320 in the loop is started.

(7) The third exemplary embodiment has been described that weight measuring device 1210 is an example of the configuration for temporarily calculating a weight of each vehicle in each of n captured images, and then, calculating a statistical weight based on the temporarily calculated weights, in the third measurement process. However, it is not necessary to temporarily calculate, for each of n captured images, the weight of each vehicle in each of n captured images, so long as the statistical weight can be calculated. For example, weight measuring device 1210 may be an example of the configuration for directly calculating the statistical weight of the vehicle using the displacement amount detected in each of n captured images and the specified displacement coefficient value, without temporarily calculating the weight for each of the captured images.

Figure 19:
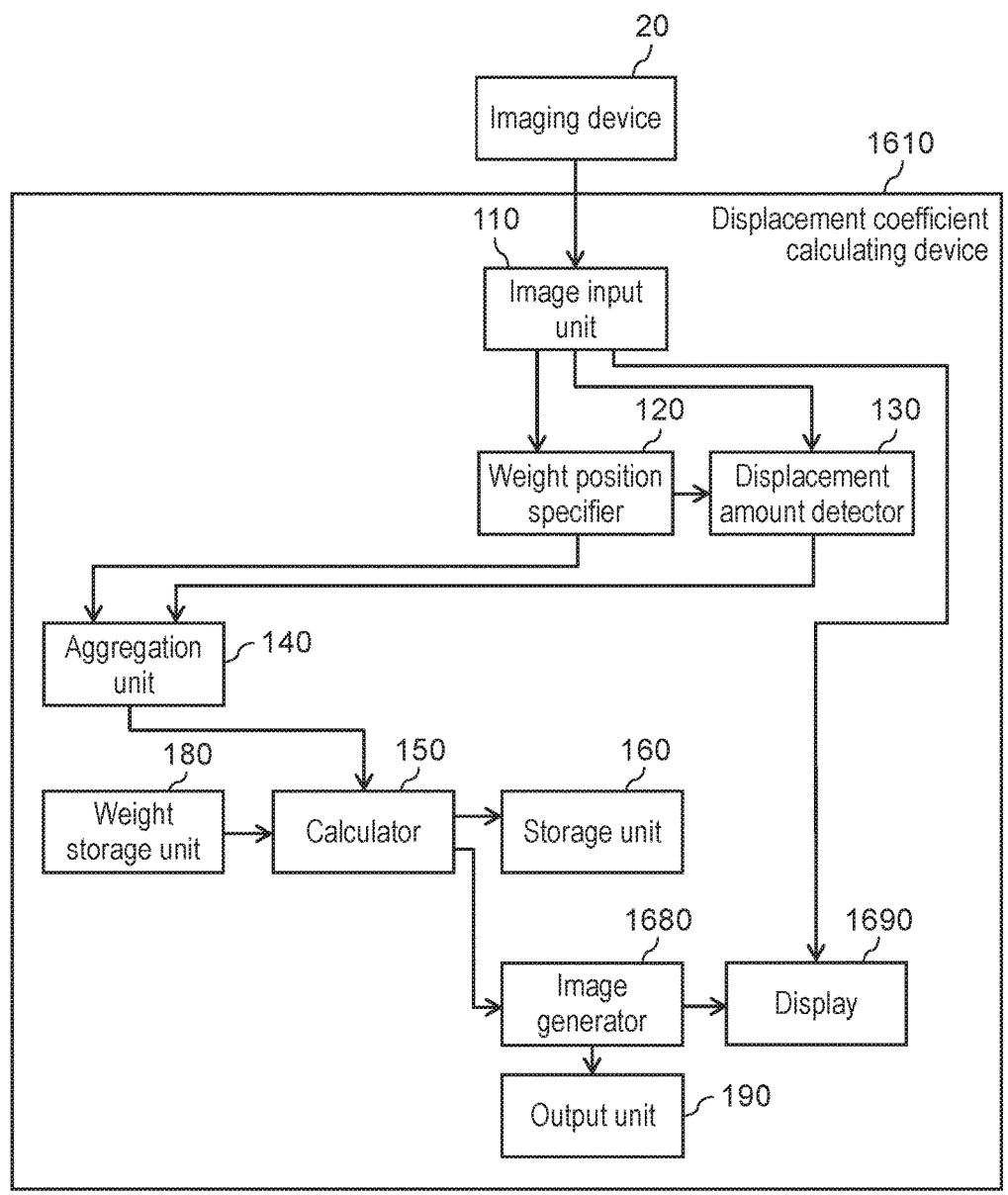
FIG. 19 is a block diagram illustrating a configuration of a displacement coefficient calculating device.

(8) In the fifth exemplary embodiment, displacement coefficient calculating device 1610 may further include output unit 190 (see FIG. 19). When a displacement coefficient deviating from a reference range is calculated by calculator 150, output unit 190 performs an output indicating that the displacement coefficient deviating from the reference range is calculated. According to this configuration, a user using displacement coefficient calculating device 1610 can be notified of a possibility of a road surface being in an abnormal state. Note that output unit 190 can provide notification to the user by issuing a sound, for example.

In addition, in the fifth exemplary embodiment, displacement coefficient calculating device 1610 may use a captured image captured by a mobile camera such as an on-vehicle camera in place of using a captured image captured by a fixed camera.

In this case, displacement coefficient calculating device 1610 can obtain a displacement coefficient relative to a different position on the road surface by measuring a displacement amount, on the road surface, relative to the known weight such as the weight of the vehicle having the mobile camera mounted thereon. Thus, the road surface state in a wide range can be detected.

(9) In each of the exemplary embodiments, the captured image may be a monochrome image, a color image, or a multispectral image. In addition, a wavelength range of light for image capture may be ultraviolet ray, near infrared ray, or far infrared ray, as well as visible light.

(10) In each of the exemplary embodiments, an asphaltic pavement has been described as the road surface. However, the present disclosure is not limited thereto. In each of the exemplary embodiments, the road surface may be made of other pavement materials such as concrete. In addition, the pavement surface may be partially covered by a plate material, a sheet material, a coating material, etc. To obtain displacement based on an image more precisely and significantly, the road surface may be covered by using the above-mentioned materials and the covered region may be defined as a region from which displacement is to be detected.

(11) The components (function blocks) in weight measuring devices 10, 1010, 1210, and 1410 and displacement coefficient calculating device 1610 may be implemented as single chips respectively, or a single chip may incorporate some or all of them, by means of a semiconductor device such as an integrated circuit (IC) or large scale integration (LSI). The method of implementing integrated circuitry is not limited to LSI, and implementation by means of dedicated circuitry or a general-purpose processor may also be used. A field programmable gate array (FPGA) for which programming is possible after LSI fabrication, or a reconfigurable processor allowing reconfiguration of connections and settings of circuit cells within an LSI, may also be used in implementing integrated circuitry. Further, if a new integrated circuit implementation technology comes out to replace the LSI as a result of the development of semiconductor technology or a derivative other technology, naturally the functional blocks may be integrated using that technology. For example, application of biotechnology is possible.

Further, all of or a part of various processes described above may be implemented by a hardware product such as an electronic circuit, or may be implemented by using software. It is to be noted that the process using software is implemented in such a way that the processor in the weight measuring device executes the program stored in the memory. Furthermore, the program may be recorded in a recording medium and may be distributed or circulated. For example, the distributed program is installed in another device including a processor and is executed by the processor of the device. In this way, the device can execute the processes described above.

In addition, embodiments implemented by any combination of the constituent elements and functions of the exemplary embodiments described above are included in the scope of the present disclosure.

The present disclosure is widely applicable to a weight measuring device for measuring a weight.

What is claimed is:

1. A weight measuring device comprising:
a memory configured to store a program; and
a processor configured to execute the program and control the weight measuring device to:
detect a displacement amount by using a captured image obtained from an imaging device, the captured image being of a road and a vehicle present on the road, the displacement amount corresponding to displacement caused on the road by application of a weight of the vehicle;
store first information indicating a relation between the weight and the displacement amount;
store second information pertaining to vehicle weight;
calculate, as the first information, a displacement coefficient for specifying the relation between the weight and the displacement amount based on a plurality of displacement amounts detected and the second information; and
calculate the weight based on the displacement amount and the first information.

2. The weight measuring device according to claim 1, the processor configured to further control the weight measuring device to:
aggregate the plurality of the displacement amounts detected, by using a plurality of the captured images, wherein
the displacement coefficient is calculated based on an aggregation result obtained.

3. The weight measuring device according to claim 2, wherein
the displacement coefficient is calculated by using, as the aggregation result, a characteristic of a displacement amount distribution corresponding to the plurality of the displacement amounts aggregated.

4. The weight measuring device according to claim 3, wherein
the characteristic of the displacement amount distribution is a mode of the displacement amount distribution, and
the second information is information indicating a weight of a vehicle model whose amount of traffic is the highest on the road.

5. The weight measuring device according to claim 1, the processor configured to further control the weight measuring device to:
recognize a specific vehicle using the captured image, wherein
the second information is information indicating a weight of the specific vehicle, and
when a displacement amount corresponding to displacement caused on the road by application of the weight of the specific vehicle is detected, the displacement coefficient is calculated based on the displacement amount and the second information.

6. The weight measuring device according to claim 1, the processor configured to further control the weight measuring device to:
specify a weight position of the vehicle in the captured image,
wherein
when a weight position is specified a displacement amount is detected, in the captured image, corresponding to displacement on the specified weight position.

7. The weight measuring device according to claim 6, wherein
the displacement coefficient has, for each of a plurality of positions which may be specified as the weight position, a numerical value, and
the weight is calculated based on the numerical value associated with the specified weight position.

8. The weight measuring device according to claim 6, wherein
a displacement amount is detected, in the captured image, corresponding to displacement on a non-weight position other than the specified weight position, and
the weight is calculated by using the displacement amount on the non-weight position.

9. The weight measuring device according to claim 1, the processor configured to further control the weight measuring device to:
recognize the vehicle captured as a second captured image at a time different from a time at which the vehicle is captured as a first captured image,
wherein
when the vehicle in the second captured image is recognized, the weight is calculated based on a first displacement amount, in the first captured image, corresponding to displacement caused on the road by application of the weight of the vehicle and a second displacement amount, in the second captured image, corresponding to displacement caused on the road by application of the weight of the vehicle.

10. The weight measuring device according to claim 1, the processor configured to further control the weight measuring device to:
when the calculated weight deviates from a predetermined reference value, provide an output indicating this deviation as a replacement of a numerical value of the calculated weight.

11. The weight measuring device according to claim 1, the processor configured to further control the weight measuring device to:
generate an image for superimposition based on the displacement coefficient calculated; and
display the image for superimposition as being superimposed on the captured image.

12. A weight measurement method comprising:
a displacement amount detection step for detecting a displacement amount by using a captured image obtained from an imaging device, the captured image being of a road and a vehicle present on the road, the displacement amount corresponding to displacement caused on the road by application of a weight of the vehicle;
a storing step for storing second information pertaining to vehicle weight;
a calculating step for calculating, as the first information, a displacement coefficient for specifying the relation between the weight and the displacement amount based on a plurality of displacement amounts detected and the second information; and
a weight calculation step for calculating the weight based on the displacement amount and information which is stored in a storage unit and indicates a relation between the weight and the displacement amount.

13. A displacement coefficient calculating device comprising:
a memory configured to store a program; and
a processor configured to execute the program and control the displacement coefficient calculating device to:
detect a displacement amount by using a captured image obtained from an imaging device, the captured image being of a road and a vehicle present on the road, the displacement amount corresponding to displacement caused on the road by application of a weight of the vehicle;
aggregate a plurality of displacement amounts detected by using a plurality of captured images obtained from the imaging device so as to obtain an aggregation result;
store information pertaining to vehicle weight; and
calculate a displacement coefficient for specifying a relation between the weight and the displacement amount based on the aggregation result and the information.

14. The displacement coefficient calculating device according to claim 13, wherein
the displacement coefficient is calculated by using, as the aggregation result, a characteristic of a displacement amount distribution corresponding to the plurality of the displacement amounts aggregated.

15. The displacement coefficient calculating device according to claim 14, wherein
the characteristic of the displacement amount distribution is a mode of the displacement amount distribution, and
the information is information indicating a weight of a vehicle model whose amount of traffic is the highest on the road.

16. The displacement coefficient calculating device according to claim 13, wherein
the displacement coefficient calculated has, for each of a plurality of different regions in the captured image, a numerical value.

17. The displacement coefficient calculating device according to claim 13, the processor configured to further control the displacement coefficient calculating device to:
when a displacement coefficient deviating from a reference range is calculated, perform an output indicating that the displacement coefficient deviating from the reference range is calculated.

18. The displacement coefficient calculating device according to claim 13, the processor configured to further control the displacement coefficient calculating device to:
generate an image for superimposition based on the displacement coefficient calculated; and
display the image for superimposition as being superimposed on the captured image.

19. A displacement coefficient calculation method comprising:
a displacement amount detection step for detecting a displacement amount by using a captured image obtained from an imaging device, the captured image being of a road and a vehicle present on the road, the displacement amount corresponding to displacement caused on the road by application of a weight of the vehicle;

an aggregation step for aggregating a plurality of displacement amounts detected in the displacement amount detection step by using a plurality of captured images obtained from the imaging device so as to obtain an aggregation result; and a calculation step for calculating a displacement coefficient for specifying a relation between the weight and the displacement amount based on the aggregation result and information pertaining to vehicle weight stored in a weight storage unit.

* * * * *